(12) United States Patent
Maeda et al.

(10) Patent No.: US 8,009,984 B2
(45) Date of Patent: Aug. 30, 2011

(54) METHOD AND APPARATUS FOR MEASURING OPTICAL POWER OF VERY WEAK LIGHT, AND OPTICAL COMMUNICATION SYSTEM USING THE SAME

(75) Inventors: Wakako Maeda, Tokyo (JP); Akio Tajima, Tokyo (JP); Akihiro Tanaka, Tokyo (JP); Seigo Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 614 days.

(21) Appl. No.: 11/589,814

(22) Filed: Oct. 31, 2006

(65) Prior Publication Data

US 2007/0098402 A1    May 3, 2007

(30) Foreign Application Priority Data

Oct. 31, 2005    (JP) .................... 2005-316320

(51) Int. Cl.
*H04B 17/00* (2006.01)
*H04B 10/08* (2006.01)
*H04B 10/12* (2006.01)
*H04L 9/08* (2006.01)
*H01S 3/00* (2006.01)

(52) U.S. Cl. ........ 398/38; 398/25; 380/256; 359/337.22

(58) Field of Classification Search .............. 398/38, 398/25; 359/337.22
See application file for complete search history.

(56) References Cited

U.S. PATENT DOCUMENTS

| 5,135,568 | A | * | 8/1992 | Fasano ................ 523/218 |
| 5,675,648 | A | * | 10/1997 | Townsend ............ 380/278 |
| 5,708,265 | A | * | 1/1998 | Poole ................ 250/227.14 |
| 5,726,787 | A | * | 3/1998 | Haus et al. ............ 398/80 |
| 5,757,912 | A |   | 5/1998 | Blow |
| 5,768,378 | A | * | 6/1998 | Townsend et al. ...... 380/256 |
| 5,818,412 | A | * | 10/1998 | Maekawa ............ 345/100 |
| 5,962,857 | A | * | 10/1999 | McKeever et al. ...... 250/484.5 |
| 6,342,701 | B1 | * | 1/2002 | Kash ................ 250/458.1 |
| 6,765,189 | B1 | * | 7/2004 | Sahu et al. ........... 250/214 A |
| 7,560,683 | B2 |   | 7/2009 | Takahashi et al. |
| 7,783,042 | B2 |   | 8/2010 | Maeda et al. |
| 2003/0058446 | A1 | * | 3/2003 | Douglas ............... 356/400 |

(Continued)

FOREIGN PATENT DOCUMENTS

GB        2 397 452 A    7/2004

(Continued)

OTHER PUBLICATIONS

Translation of JP 2004264097 A.*

(Continued)

*Primary Examiner* — Ken N Vanderpuye
*Assistant Examiner* — Oommen Jacob
(74) *Attorney, Agent, or Firm* — Foley & Lardner LLP

(57) ABSTRACT

A method and apparatus for measuring the optical power of very weak light arriving at a receiver, by using a photon detector, are provided. A photon detector detects the presence or absence of the arrival of a photon in accordance with bias application timing. For a train of optical pulses coming in at an arbitrary timing in respective time slots, the bias application timing is sequentially shifted within the range of a time slot. Each time a shift is made, the number of photons detected is counted by a photon counter. Based on this number of photons, the optical power of the train of the optical pulses is measured.

28 Claims, 15 Drawing Sheets

U.S. PATENT DOCUMENTS

| | | |
|---|---|---|
| 2004/0170428 A1* | 9/2004 | Barker et al. .................. 398/33 |
| 2005/0078827 A1 | 4/2005 | Tajima |
| 2005/0256650 A1* | 11/2005 | Labarbe et al. ................. 702/19 |
| 2005/0286390 A1* | 12/2005 | Minemura et al. ............ 369/116 |
| 2006/0001943 A1* | 1/2006 | Simic-Glavaski ............ 359/245 |

FOREIGN PATENT DOCUMENTS

| | | | |
|---|---|---|---|
| JP | 9-502322 A | | 3/1997 |
| JP | 2004264097 A | * | 9/2004 |
| JP | 2005-117512 A | | 4/2005 |
| JP | 2005-260911 A | | 9/2005 |
| JP | 2006-284202 A | | 10/2006 |
| WO | WO 2005/057823 A1 | | 6/2005 |
| WO | WO 2005/086409 A1 | | 9/2005 |

OTHER PUBLICATIONS

C. H. Bennett et al., "Quantum Cryptography, Public Key Distribution and Coin Tossing," International Conference on Computers, Systems & Signal Processing, Dec. 10-12, 1984, pp. 175-179.

G. Ribordy et al., "Automated 'plug & play' quantum key distribution," Electronics Letters, vol. 34:22, Oct. 29, 1998, pp. 2116-2117.

* cited by examiner

FIG. 11

| CLOCK SHIFT | 1 | 2 | 3 | ... | i | ... | N |
|---|---|---|---|---|---|---|---|
| APD POWER RATIO | | | | | | | |
| $P_0/P_1$ (BASIS +, RANDOM NUMBER 0) | A1 | A2 | A3 | ... | Ai | ... | $A_N$ |
| $P_1/P_0$ (BASIS +, RANDOM NUMBER 1) | B1 | B2 | B3 | ... | Bi | ... | $B_N$ |
| $P_0/P_1$ (BASIS X, RANDOM NUMBER 0) | C1 | C2 | C3 | ... | Ci | ... | $C_N$ |
| $P_1/P_0$ (BASIS X, RANDOM NUMBER 1) | D1 | D2 | D3 | ... | Di | ... | $D_N$ |
| Ei=Ai*Bi*Ci*Di(i=1~N) | E1 | E2 | E3 | ... | Ei | ... | $E_N$ |

BASIS +
RANDOM NUMBER 0

BASIS +
RANDOM NUMBER 1

BASIS ×
RANDOM NUMBER 0

BASIS ×
RANDOM NUMBER 1

FIG. 17A

| CLOCK SHIFT<br>APD POWER RATIO | 1 | 2 | 3 | ... | i | ... | N |
|---|---|---|---|---|---|---|---|
| $P_0/P_1$ (BASIS +, RANDOM NUMBER 0) | A1 | A2 | A3 | ... | Ai | ... | $A_N$ |
| $P_1/P_0$ (BASIS +, RANDOM NUMBER 1) | B1 | B2 | B3 | ... | Bi | ... | $B_N$ |
| $P_0/P_1$ (BASIS ×, RANDOM NUMBER 0) | C1 | C2 | C3 | ... | Ci | ... | $C_N$ |
| $P_1/P_0$ (BASIS ×, RANDOM NUMBER 1) | D1 | D2 | D3 | ... | Di | ... | $D_N$ |
| $Ei=Ai*Bi*Ci*Di(i=1\sim N)$ | E1 | E2 | E3 | ... | Ei | ... | $E_N$ |

FIG. 17B

| CLOCK SHIFT<br>APD POWER RATIO | 1 | 2 | 3 | ... | j | ... | n |
|---|---|---|---|---|---|---|---|
| $c_0(\text{lsuit. }j)/c_1(\text{lsuit. }j)$ (BASIS +, RANDOM NUMBER 0) | A1 | A2 | A3 | ... | Aj | ... | $A_n$ |
| $c_1(\text{lsuit. }j)/c_0(\text{lsuit. }j)$ (BASIS +, RANDOM NUMBER 1) | B1 | B2 | B3 | ... | Bj | ... | $B_n$ |
| $c_0(\text{lsuit. }j)/c_1(\text{lsuit. }j)$ (BASIS ×, RANDOM NUMBER 0) | C1 | C2 | C3 | ... | Cj | ... | $C_n$ |
| $c_1(\text{lsuit. }j)/c_0(\text{lsuit. }j)$ (BASIS ×, RANDOM NUMBER 1) | D1 | D2 | D3 | ... | Dj | ... | $D_n$ |
| $Ej=Aj*Bj*Cj*Dj(j=1\sim n)$ | E1 | E2 | E3 | ... | Ej | ... | $E_n$ |

METHOD AND APPARATUS FOR MEASURING OPTICAL POWER OF VERY WEAK LIGHT, AND OPTICAL COMMUNICATION SYSTEM USING THE SAME

BACKGROUND OF THE INVENTION

1. Field of the Invention

The present invention relates to techniques of measuring the optical power of light and, more particularly, to a method and apparatus for measuring the optical power of very weak light and an optical communication system using the method.

2. Description of the Related Art

In the field of optical communications, in recent years, active studies have been devoted to quantum key distribution systems, which are regarded as realizing the high secrecy along a transmission line, and a variety of proposals have been made in regard to the systems.

As a basic one of the systems, a system which allows a sender and a receiver to share a quantum cryptographic key by using two types of bases is proposed in Bennett and brassard, "QUANTUM CRYPTOGRAPHY, PUBLIC KEY DISTRIBUTION AND COIN TOSSING" IEEE International Conference on Computers, Systems, and Signal Processing, Bangalore, India, pp. 175-179. According to this proposal, the sender phase-modulates a photon by using any one of four kinds of information according to the combinations of two bases (D, R) each representing quantum states, and binary random data (0, 1), and then transmits the phase-modulated photon to the receiver. The receiver receives the photon by using the bases (D, R) independently of the sender and stores the reception data. Thereafter, the sender and receiver use an ordinary channel to check whether or not the bases used in transmission and the bases used in reception are the same, and determine final shared secret data based only on the reception data corresponding to the matching bases.

A plug and play quantum key distribution system proposed by a team of the University of Geneva, Switzerland (see G. Ribordy, "Automated 'plug & play' quantum key distribution", Electronics Letters, Vol. 34, No. 22, PP. 2116-2117) is thought of as a promising scheme for bringing polarization-sensitive quantum key distribution systems into practical use, because this system can compensate for the fluctuation in polarization occurring along an optical fiber transmission line. A schematic configuration of a plug and play system is shown in FIG. 1.

As shown in FIG. 1, in the plug and play system, a receiver, the one to receive a quantum cryptographic key, is provided with a laser LD, which generates optical pulses P. An optical pulse P is split into two parts at an optical coupler, and one of the two parts, an optical pulse P1, passes along a short path, whereas the other one, an optical pulse P2, passes along a long path. The pulses P1 and P2 are transmitted to a sender as double pulses.

The sender is provided with a Faraday mirror and a phase modulator A. The received optical pulses P1 and P2 are reflected by the Faraday mirror individually, whereby they are sent back to the receiver with their polarization states rotated by 90 degrees. In this event, the phase modulator A phase-modulates the optical pulse P2 at the timing when the optical pulse P2 is passing through the phase modulator A. The phase-modulated optical pulse $P2*^a$ is returned to the receiver.

Since the polarization state of each of the optical pulses P1 and $P2*^a$ received from the sender has been rotated by 90 degrees, a polarization beam splitter PBS in the receiver leads each of these received pulses into the other path that is different from the path the pulse used when it was transmitted to the sender. Specifically, the received optical pulse P1 is led into the long path and phase-modulated at the timing when it is passing through a phase modulator B, and the phase-modulated optical pulse $P1*^b$ arrives at the optical coupler. On the other hand, the optical pulse $P2*^a$, which has been phase-modulated at the sender, passes along the short path, which is different from the path it used when transmitted to the sender, and then arrives at the same optical coupler. Accordingly, the optical pulse $P2*^a$, phase-modulated on the sender side, and the optical pulse $P1*^b$, phase-modulated on the receiver side, interfere with each other, and the result of this interference is detected by a photon detector APD0 or APD1. Note that avalanche photodiodes are used as the photon detectors, which are driven in a gated Geiger mode (GGM).

As described above, one optical pulse generated at the receiver is split into two, and the thus obtained double pulses P1 and P2 each have a round-trip between the receiver and sender while being phase-modulated individually. As a whole, the two pulses pass along the same optical path and then interfere with each other. Accordingly, the result of the interference observed by the photon detector APD0 or APD1, in which variations in delay due to an optical fiber transmission line are cancelled out, depends on the difference between the amount of a phase modulation at the sender and the amount of a phase modulation at the receiver.

A plug and play system having such a configuration requires synchronization as cited below.

(1) In the sender, it is necessary to apply a voltage corresponding to the amount of a phase modulation to the phase modulator A synchronously with the timing when the optical pulse P2 transmitted from the receiver is passing through the phase modulator A.

(2) In the receiver, it is necessary to apply a voltage corresponding to the amount of a phase modulation to the phase modulator B synchronously with the timing when the optical pulse P1 returned from the sender is passing through the phase modulator B.

(3) Further in the receiver, it is necessary to apply bias to the photon detectors APD0 and APD1 synchronously with the timing of the incidence of the returned pulse (supersensitive reception in the gated Geiger mode).

As described above, for a quantum key distribution system to stably generate a quantum cryptographic key by achieving high interference in practice, it is indispensable to perform such timing control that the phase modulator A on the sender side and the phase modulator B and photon detectors APD on the receiver side are each driven synchronously with the timing of the arrival of an optical pulse.

In the case of a system that transmits information by utilizing phase modulation such as the above-described quantum key distribution system, it cannot be determined whether or not the timing of driving the phase modulator A at the sender is right, unless the result of the interference observed by the photon detector APD0 or APD1 on the receiver side is referred to. Accordingly, in order to accurately perform the above-mentioned timing control, it is necessary to accurately know the extinction ratio of the interferometer (the ratio between the optical powers observed by the photon detectors APD0 and APD1) at the receiver.

However, in the case of the gated-Geiger-mode reception, bias is applied to a photon detector APD only for a predetermined period of time, at the timing of the arrival of an optical pulse. If a photon arrives while the gate voltage is being applied, the photon detector APD is broken down, and multiplication current continues to flow until the application of gate voltage is finished. Therefore, what can be detected by the photon detector is, except a noise, merely whether or not a photon arrives during the gate voltage application, and the extinction ratio, which is obtained based on the time average of photon detections, cannot be measured.

Therefore, it has been conventionally necessary that, each time transmission paths are changed, the extinction ratio be measured by using, for example, optical power measurement equipment in place of the photon detectors APD and then the timing of applying voltage to the phase modulator at the sender be determined. In other words, it has been necessary to provide the receiver with both the optical power measurement equipment for determining the sender's driving timing and the photon detectors APD for quantum cryptographic key generation.

SUMMARY OF THE INVENTION

An object of the present invention is to provide a method and apparatus for measuring the optical power of very weak light by using a photon detector.

Another object of the present invention is to provide an optical communication system that optimizes the timing in the sender by using the weak-light power measurement method and thus enables information to be stably transmitted at right timing.

Still another object of the present invention is to provide an optical communication system that drives the phase modulator on the sender side at right timing and thus enables high-speed, stable quantum key distribution.

According to the present invention, the optical power of a series of optical pulses can be measured by using a photon detector for detecting photon arrival according to driving timing. The optical power of a series of optical pulses can be measured based on the number of photons counted by shifting the driving timing.

In an optical communication system according to the present invention, a first communication device includes: a modulator for modulating a series of optical pulses according to original information to be transmitted, at given modulation timing to transmit the series of modulated optical pulses to a second communication device through a first communication channel; and a timing supplier for supplying the modulation timing to the modulator, wherein the modulation timing is changeable. The second communication device includes: a photon detector for detecting photon arrival of the series of optical pulses through the first communication-channel according to driving timing; a counter for counting a number of photons detected by the photon detector; a measurement section for measuring optical power of the series of optical pulses based on the number of photons counted by shifting the driving timing; and a timing controller for controlling the modulation timing of the first communication device through a second communication channel based on the optical power measured by the measurement section.

As described above, according to the present invention, by shifting the phase of driving timing at which a bias voltage is applied to a photon detector, a photon counter counts the number of photons which have arrived for a period of time during which the bias voltage is applied to the photon detector. Assuming that the wavelength of optical pulses is known, the optical power of the optical pulses can be obtained from the number of counted photons. Accordingly, a photon detector can be used to measure the optical power or similar physical quantity of very weak light.

Since the optical power or similar physical quantity of very weak light can be measured by a photon detector in the above manner, an optical transmitter in an optical communication system can be operated at optimal timing, resulting in stable information transmission. In the case of the present invention being applied to a quantum key distribution system, a phase modulator at a transmitting side can be operated at right timing, resulting in high-speed and stable quantum key distribution.

BRIEF DESCRIPTION OF THE DRAWINGS

FIG. 11 is a diagram schematically showing a data table of the effective photon counts of the photon detectors APD0 and APD1 and the amounts of the clock shift, stored in a memory 270.

FIG. 17A is a diagram schematically showing a data table of the ratios between the photon counts of the photon detectors APD0 and APD1 and the amounts of the clock shift on the sender side, stored in the memory 270.

FIG. 17B is a diagram schematically showing a data table of the ratios between the photon counts of the photon detectors APD0 and APD1 and the amounts of the clock shift on the receiver side, stored in the memory 270.

DETAILED DESCRIPTION OF THE PREFERRED EMBODIMENTS

Figure 2:
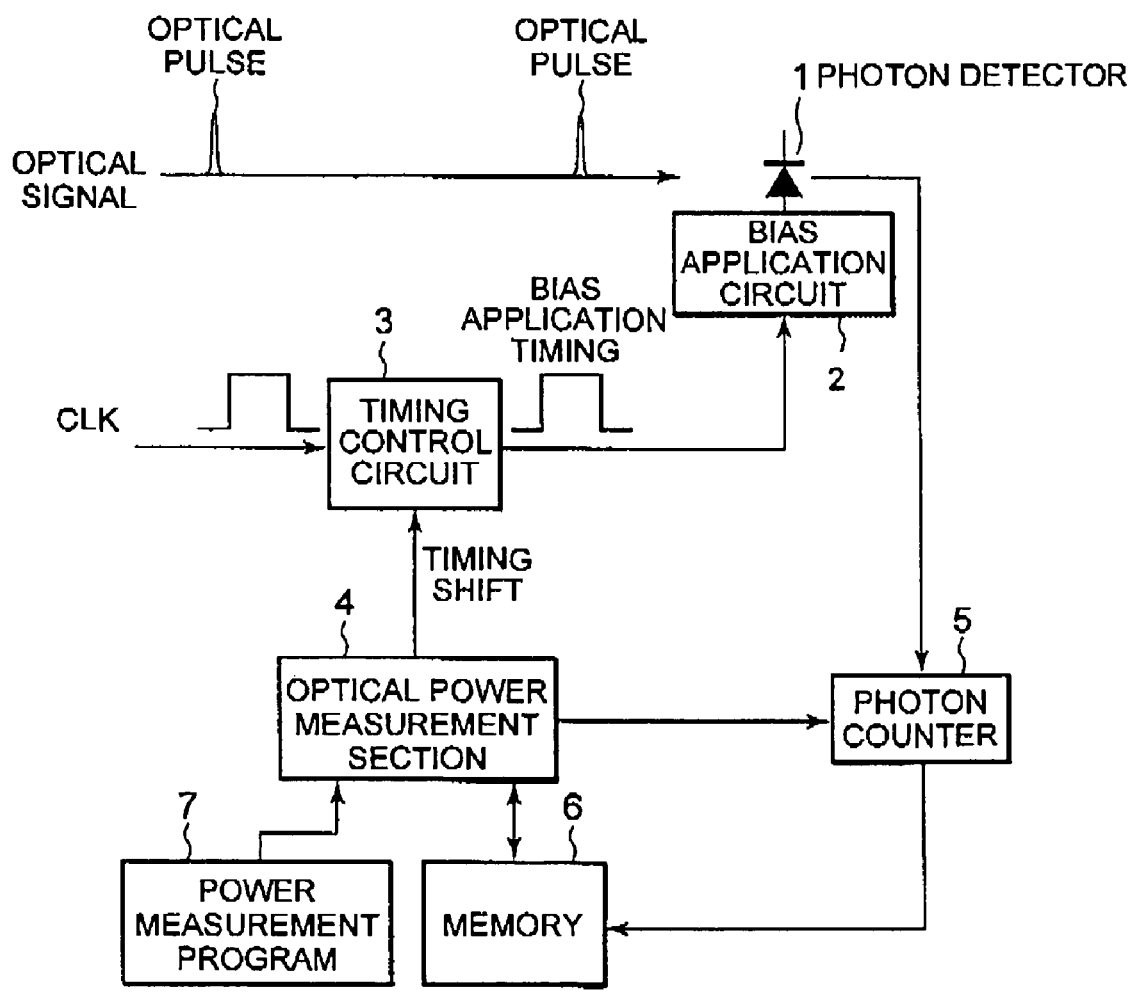
FIG. 2 is a block diagram showing a schematic configuration of a weak-light power measurement apparatus according to a mode of the present invention.

FIG. 2 is a block diagram showing a schematic configuration of a weak-light power measurement apparatus according to a mode of the present invention. A photon detector 1 is an optical-to-electrical conversion device that can detect the presence or absence of the incidence of a single photon when bias voltage is being applied, and is typically an avalanche photodiode. The photon detector 1 is driven by bias voltage applied from a bias application circuit 2. The timing of the bias voltage application and the duration thereof are controlled by a timing control circuit 3. In other words, the photon detector 1 is operated in a gated Geiger mode in which bias voltage is applied only when an optical pulse is about to be detected, and is capable of high-sensitivity reception.

The timing control circuit 3 can freely shift the phase of a clock signal CLK in steps of $2\pi/n$ from 0 to $2\pi$ along the time axis, based on timing shift control from an optical power measurement section 4. It is assumed here that the period of the clock signal CLK is substantially coincident with the period of incoming optical pulses, but that it is unknown which phase the arrivals of the optical pulses coincide with. Incidentally, as an example, an optical pulse has a pulse width of about one nanosecond, the pulse-shaped bias voltage applied to the photon detector 1 has a pulse width of about one to five nanoseconds, and these pulses have a period T of about 16 nanoseconds.

The photon detector 1 can detect photon arrival as an optical pulse if the timing of the phase-shifted clock signal coincides with the timing of the arrival of the optical pulse. When photon arrival is detected by the photon detector 1, it is counted by a photon counter 5. The photon counter 5 stores the number of counted photons in a memory 6, under the control of the optical power measurement section 4. However, the number of counted photons actually includes the number of counted dark noises.

The optical power measurement section 4, as will be described later, sequentially shifts the phase of the clock signal CLK by $2\pi/n$ at a time, from 0 to $2\pi$, whereby bias voltage is applied to the photon detector 1 at the timing corresponding to each shifted clock phase. Each time a shift is made, the clock phase and the number of detected photons are stored in the memory 6. When the phase of the clock signal CLK is shifted up to $2\pi$, the optical power measurement section 4 measures the optical power of the train of optical pulses that have arrived, based on the data stored in the memory 6. Assuming that a time interval corresponding to the period T of the clock signal CLK is referred to as a time slot, shifting the phase of the clock signal CLK from 0 up to $2\pi$ is equivalent to temporally moving the bias voltage application timing in the full range of the time slot.

Note that the optical power measurement section 4 can be implemented by executing a power measurement program stored in a program memory 7, on a computer or program-controlled processor. Hereinafter, a weak-light power measurement method according to the present mode will be described in detail.

Figure 3:
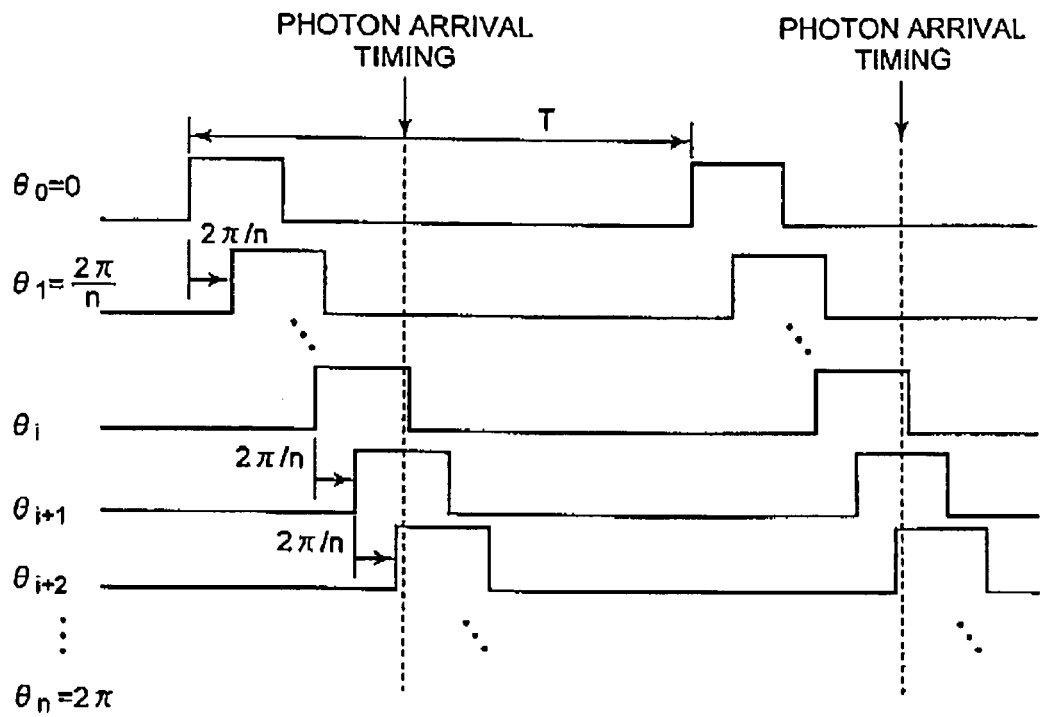
FIG. 3 is a waveform diagram for describing the states of phase shifts for bias application timing, in a weak-light power measurement method according to this mode.
Figure 4:
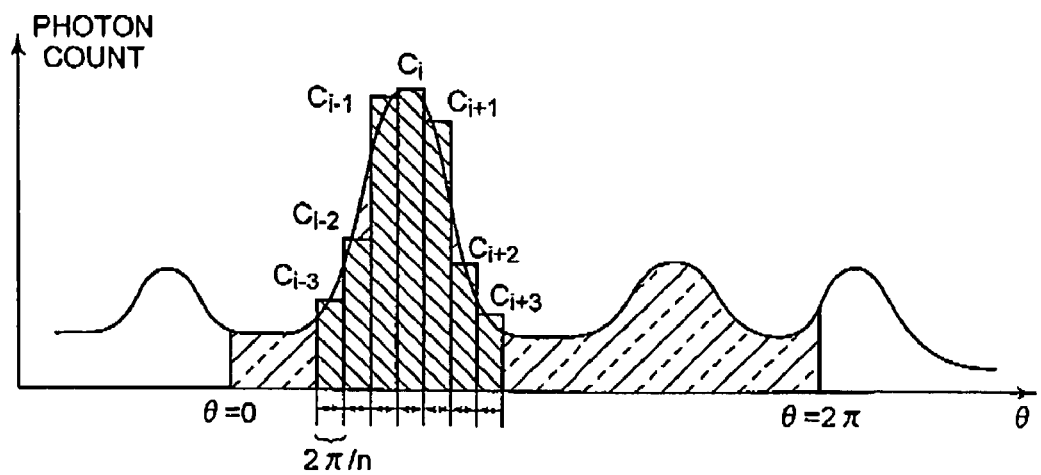
FIG. 4 is a graph schematically showing a photon count varying with the amount of a phase shift.

FIG. 3 is a waveform diagram for describing the states of phase shifts for the bias application timing, in the weak-light power measurement method according to the present mode. FIG. 4 is a graph schematically showing the photon count varying with the amount of the phase shift.

As shown in FIG. 3, first, the optical power measurement section 4 sets a timing shift θ, made in the clock signal CLK of the timing control circuit 3, at zero. Next, the optical power measurement section 4 causes the timing control circuit 3 to shift the timing of the clock signal CLK by one step ($2\pi/n$). As a result, the timing of applying the pulse bias to the photon detector 1 is shifted by $2\pi/n$. In accordance with this timing, pulses of bias voltage are applied to the photon detector 1 for a certain period of time (actually, a period of time corresponding to a plurality of time slots). If a photon arrives, or a dark noise occurs, while this bias voltage is being applied, it is counted as photon detection by the photon counter 5. The number of counted photons is stored in the memory 6.

The optical power measurement section 4 similarly repeats the shifting of the timing of the clock signal CLK by $2\pi/n$, n times. Each time a shift is made, the number of photons counted by the photon counter 5 is stored in the memory 6, along with the amount of a phase shift at that time if necessary. The amount of the clock shift, $\theta_j$, and the number of the counted photons, $c_j$, when j timing shifts have been made, can be graphed as shown in FIG. 4.

Although in the varying count values shown in FIG. 4 there is an apparent peak around a certain amount of the phase shift, a peak does not always appear. When no photon arrives, only a dark count is made, in which case a peak as shown in FIG. 4 does not appear, and the count values are low at any phases. If a photon arrives, a peak as shown in FIG. 4 appears only at a phase corresponding to the photon arrival timing in question.

As shown in FIG. 4, assuming that P is the sum of the photon counts made when the clock timing has been shifted n times, P is represented by the following equation:

$$P = \sum_{i=1}^{n} c_i.$$

This total photon count, P, corresponds to the diagonally hatched area in FIG. 4, surrounded by the vertical lines at θ=0 and θ=$2\pi$ and the curve showing the photon count $c_j$. That is, this represents the average optical power. Accordingly, the optical power of very weak light can be measured with the photon detector, by counting the number of photons while the timing of applying bias to the photon detector 1 is sequentially shifted from 0 to $2\pi$ as described above.

Next, embodiments will be described in which the above-described weak-light power measurement method is actually applied to the interference measurement in a quantum cryptographic system.

1. First Embodiment

Figure 5:
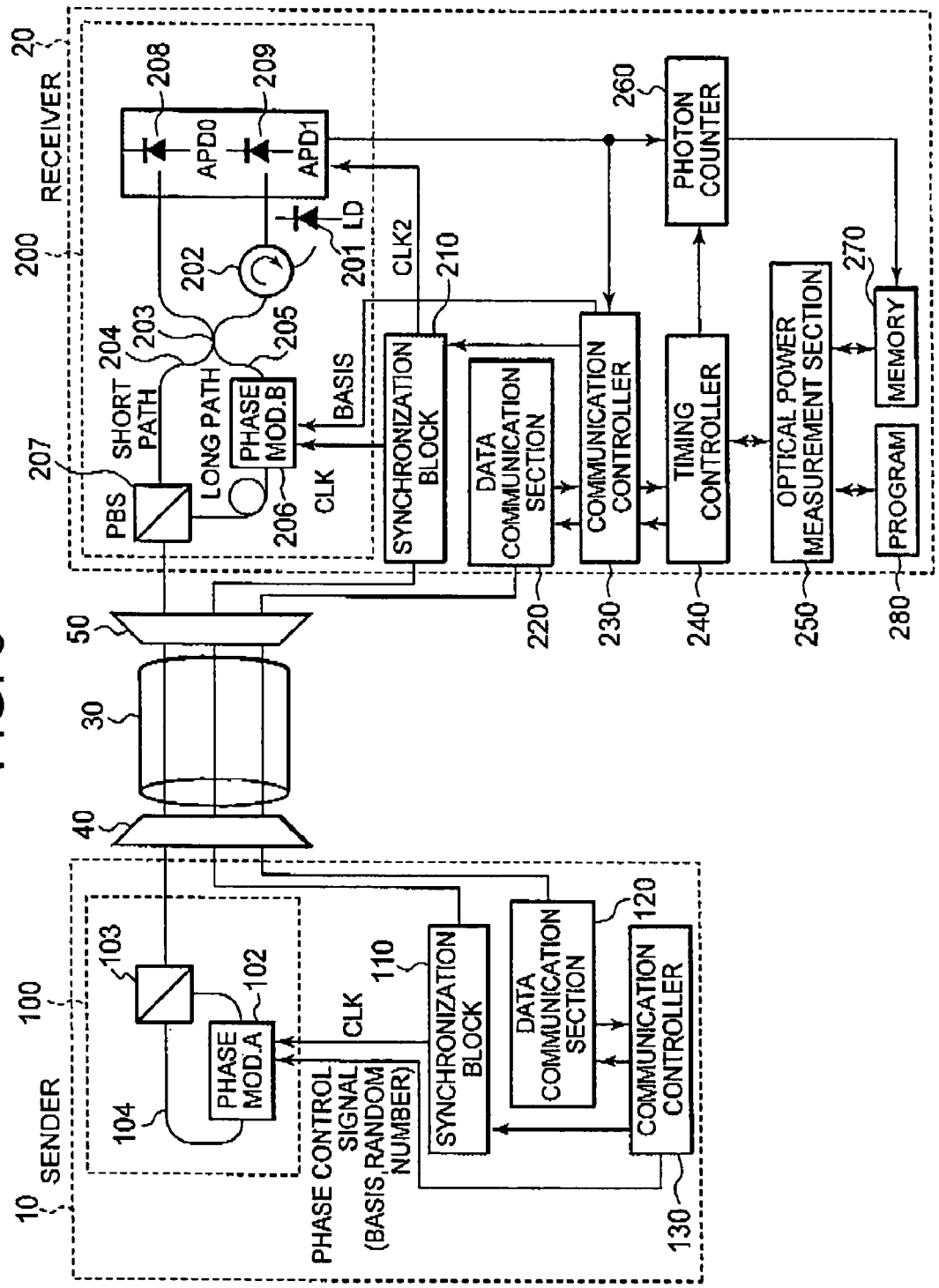
FIG. 5 is a block diagram showing a configuration of a temperature-independent plug and play system according to a first embodiment of the present invention.

FIG. 5 is a block diagram showing a configuration of a temperature-independent plug and play system according to a first embodiment of the present invention. Here, the system configuration is illustrated as an example, in which, of two communication devices that perform quantum communications, the sending side of the quantum communications is referred to as a sender 10, the receiving side thereof is referred to as a receiver 20, and the sender 10 and receiver 20 are optically connected through an optical transmission line 30.

The basic configuration and operations of the plug and play system according to the first embodiment are as described with reference to FIG. 1, except that a PBS loop is employed at the sender 10 in place of a Faraday mirror.

A quantum block 100 at the sender 10 has a PBS loop 104, which includes a phase modulator 102 and a polarization beam splitter (PBS) 103.

The phase modulator 102 performs phase modulation on a train of passing optical pulses, in accordance with a clock signal supplied from a synchronization block 110. The depth of a phase modulation is determined by a phase control signal given from a communication controller 130. Here, there are four depths ($0, \pi/2, \pi, 3\pi/2$) corresponding to four combinations of a basis (+/×) and a random number (0/1). The phase control signal is a voltage corresponding to any one of the modulation depths. The phase control signal is applied to the phase modulator 102 at the timing when an optical pulse is passing through the phase modulator 102, whereby the optical pulse is phase-modulated.

The PBS loop 104 has a function similar to that of a Faraday mirror and outputs incident light with its polarization state rotated by 90 degrees. The PBS loop of the present embodiment will be described later.

Moreover, the sender 10 is provided with the synchronization block 110, a data communication section 120, and the communication controller 130. Under the control of the communication controller 130, the synchronization block 110 exchanges clock signals with the receiver 20 and supplies a clock signal CLK to the phase modulator 102. The communication controller 130 exchanges control signals with the receiver 20 through the data communication section 120 and controls the quantum block 100 and synchronization block 110 in accordance with the control signals from the receiver 20.

Figure 1:
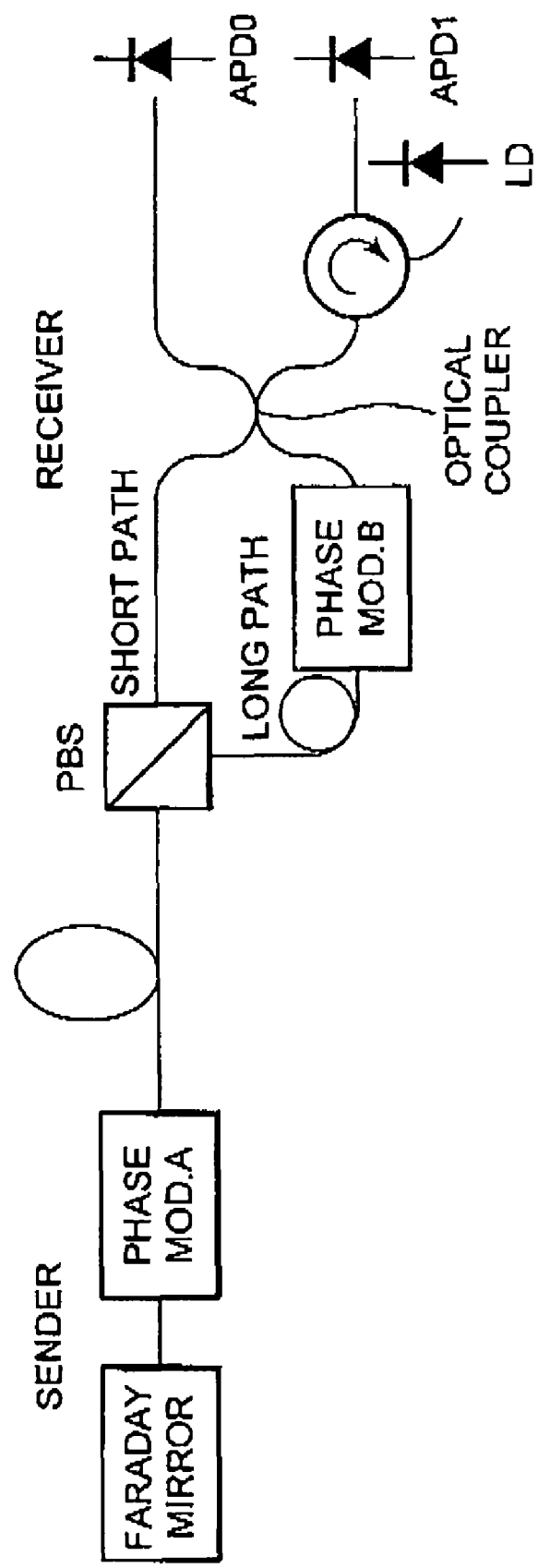
FIG. 1 is a block diagram showing a schematic configuration of a plug and play system.

The configuration of a quantum block 200 at the receiver 20 is basically the same as the configuration shown in FIG. 1. An optical pulse P, generated by a laser 201 in accordance with a reference clock signal, is led by an optical circulator 202 into an optical coupler 203, where the optical pulse P is split into two parts. One of the two parts, an optical pulse P1, goes along a short path 204 and is sent to a polarization beam splitter (PBS) 207. The other one, an optical pulse P2, is passed through a phase modulator 206, which is provided in a long path 205, and then sent to the PBS 207. These optical pulses P1 and P2 are combined at the PBS 207 and transmitted to the sender 10 as double pulses, through a wavelength multiplexing/demultiplexing filter 50 and the optical transmission line 30. Each of the double pulses returned from the sender 10 is sent, by the PBS 207, into the other path that is different from the path the optical pulse used when it was transmitted to the sender 10, and the optical pulses interfere with each other at the optical coupler 203, which will be described later. The result of this interference is detected by a photon detector 208 (hereinafter, referred to as APD0), or a photon detector 209 (hereinafter, referred to as APD1). Incidentally, the short path 204 and long path 205 are polarization-maintained fiber, and the optical circulator 202 and optical coupler 203 are of polarization-maintained types.

The receiver 20 is provided with a synchronization block 210 that supplies the quantum block 200 with a clock signal CLK1 for phase modulation and with a clock signal CLK2 for the operation of the photon detectors in the gated Geiger mode. The synchronization block 210 exchanges synchronization clock signals with the synchronization block 110 at the sender 10. Moreover, a communication controller 230 at the receiver 20 exchanges control signals with the sender 10 through a data communication section 220 and controls the quantum block 200 and synchronization block 210.

In addition to these blocks and sections, the receiver 20 in the system according to the present embodiment is provided with a timing controller 240 that optimizes the timing in the sender 10 and the timing in the receiver 20 by controlling the communication controller 230, and with a power measurement section 250 for measuring optical power by using the photon detectors APD0 and APD1. The optical power measurement section 250 controls the timing controller 240, a photon counter 260 and a memory 270; has the photon counter 260 count the number of photons detected by the photon detectors APD0 and APD1 individually; and stores the count values in the memory 270 as measurement data used to determine the optimal timing and to measure the optical power. The timing controller 240 and optical power measurement section 250 can be implemented by executing a program stored in a program memory 280, on a computer or program-controlled processor.

Incidentally, a clock signal sent and received between the synchronization blocks 110 and 210 and a control signal sent and received between the data communication sections 120 and 220 are signals each having a wavelength different from that of the optical pulses sent and received between the quantum blocks 100 and 200. These signals are wavelength-multiplexed and -demultiplexed by the wavelength multiplexing/demultiplexing filters 40 and 50 and are transmitted over the optical transmission line 30 by using wavelength division multiplexing technology. In addition, the synchronization block 110 provided to the sender 10 and the synchronization block 210 provided to the receiver 20 each have a wavelength stabilized laser as a light source that sends out a clock signal. Accordingly, it is possible to supply a stabilized clock signal to each of the quantum blocks 100 and 200.

Next, a further detailed description will be given of the paths of the double pulses P1 and P2 after output to the optical transmission line 30 from the quantum block 200 at the receiver 20, and the processing during the propagation of the double pulses P1 and P2 along the respective paths.

In the sender 10, each of the double pulses P1 and P2 that have arrived through the optical transmission line 30 and wavelength multiplexing/demultiplexing filter 50 is further split at the PBS 103, resulting in four pulses (i.e., quartet pulses) including clockwise double pulses $P1_{cw}$ and $P2_{cw}$ and counterclockwise double pulses $P1_{ccw}$ and $P2_{ccw}$. Each pair of the double pulses pass through the phase modulator 102 in the opposite direction to the other pair and enter a PBS port different from the port from which the pair were output.

The phase modulator 102 phase-modulates the pulse $P2_{cw}$, which is the second one of the clockwise double pulses, with respect to the first pulse $P1_{cw}$ and also gives a phase difference of $\pi$ between the counterclockwise double pulses and the clockwise double pulses, which will be described later. The phase modulator 102 needs such timing control as to perform an arbitrary phase modulation on each of the quartet pulses as described above.

The quartet pulses thus phase-modulated as required are combined at the PBS 103, returning to the double pulses. As described above, since only the following one of the pulses has been phase-modulated based on transmission information, the output double pulses are denoted by P1 and $P2^{*a}$. At this point in time when the double pulses are output, the polarization states of the double pulses have been rotated by 90 degrees with respect to those when they were input. Consequently, an effect similar to a Faraday mirror can be obtained.

In the receiver 20, since the polarization states of the optical pulses P1 and $P2^{*a}$ received from the sender 10 have been rotated by 90 degrees, the PBS 207 leads each of these received pulses into the other path that is different from the path the pulse used when it was transmitted to the sender 10.

Specifically, the received optical pulse P1 is led into the long path and phase-modulated based on a designated basis at the timing when it is passing through the phase modulator 206, and the phase-modulated optical pulse P1*$^b$ arrives at the optical coupler 203. On the other hand, the optical pulse P2*$^a$ passes along the short path, which is different from the path it used when it was transmitted to the sender 10, and arrives at the same optical coupler 203.

Thus, the optical pulse P2*$^a$, phase-modulated on the sender side, and the optical pulse P1*$^b$, phase-modulated on the receiver side, interfere with each other, and the result of this interference is detected by the photon detector APD0 or APD1. The photon detectors APD0 and APD1 are driven in the gated Geiger mode in accordance with the clock signal CLK2 supplied from the synchronization block 210, and their detection signals are output to the communication controller 230 and the photon counter 260. As will be described later, the timing controller 240 accumulates in the memory 270 the detection signals detected by the photon detectors APD0 and APD1 in a sequence of timing control, and uses them to determine the optimal timing. In addition, the count value made by the photon counter 260 is also stored in the memory 270 along with the then amount of a phase shift.

1.1) Phase Modulation by PBS Loop

Hereinafter, the operation of the PBS loop will be described.

Figure 6:
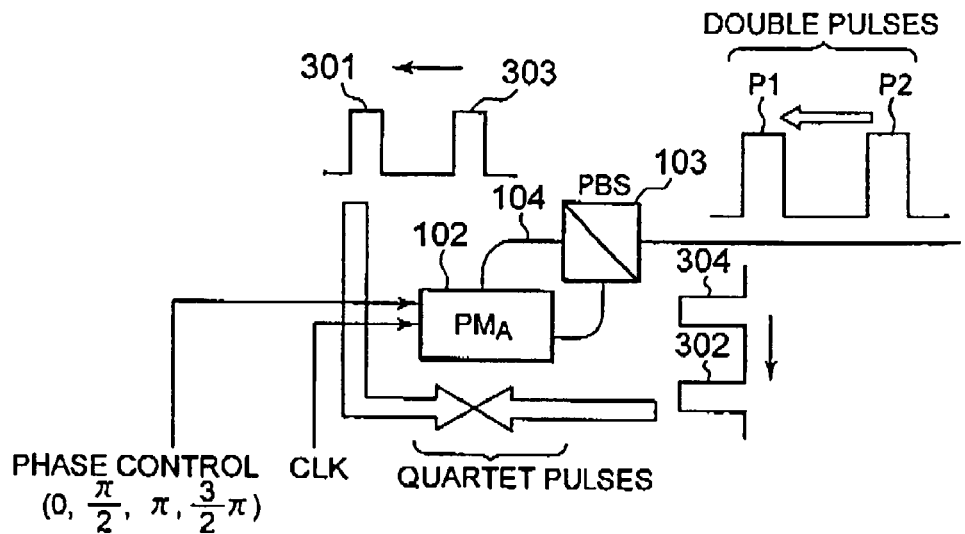
FIG. 6 is a schematic configuration diagram for describing the operation of a PBS loop at a sender.

FIG. 6 is a schematic configuration diagram for describing the operation of the PBS loop at the sender. As described above, each of the incoming double pulses P1 and P2 is split at the PBS 103 into orthogonal polarization components, resulting in the quartet pulses 301 to 304. The optical pulses 301 and 302 correspond to one polarization component of the optical pulse P1 and the other component perpendicular to it. The optical pulses 303 and 304 correspond to one polarization component of the optical pulse P2 and the other component perpendicular to it.

Two loop-side ports of the PBS 103 are respectively connected to two optical ports of the phase modulator 102 by polarization-maintained optical fiber. However, the lengths of the optical paths between these ports are different from each other. It is assumed here that the lengths of the optical paths are set so that the optical pulses 301 and 303 enter the phase modulator 102 earlier than the optical pulses 302 and 304 by a period of time T, respectively. This time difference T is set so as to be longer than the width of an optical pulse and shorter than the interval between the double pulses P1 and P2.

Figure 7:
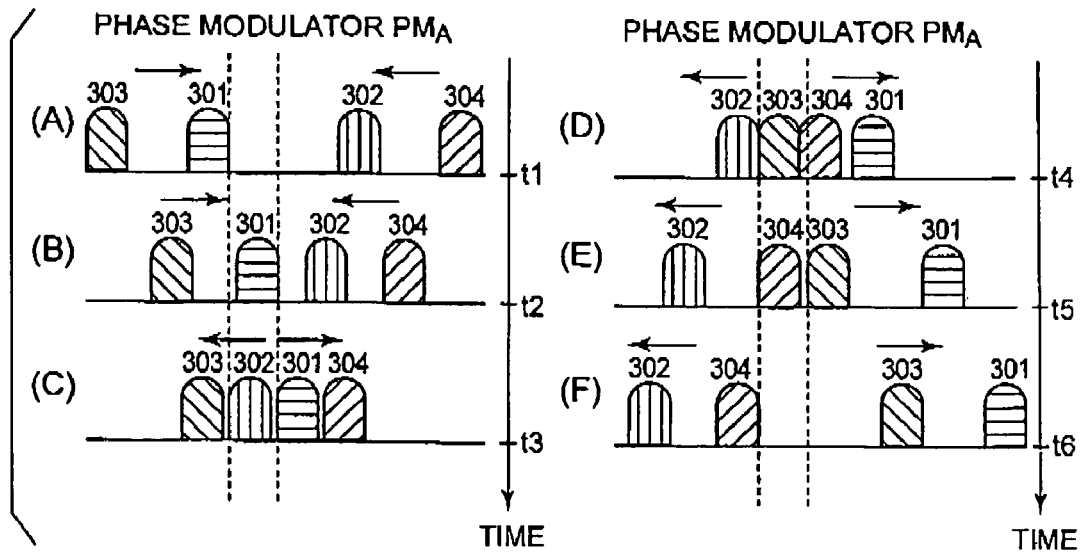
FIG. 7 is an explanatory diagram showing a time sequence of optical pulses propagating through the PBS loop.

FIG. 7 is an explanatory diagram showing a time sequence of the optical pulses propagating through the PBS loop. Since the optical pulses 301 and 303 arrives at the phase modulator 102 earlier than the optical pulses 302 and 304 by the period of time T, respectively, the optical pulses pass through the phase modulator 102 at different times t1 to t6 as shown in FIGS. 7(A) to 7(F). Therefore, the voltage to be applied to the phase modulator 102 is varied in synchronization with the pulse intervals, whereby different phase differences can be given between the optical pulses. Here, the phase differences to be given between the individual pulses are set as shown in Table I.

TABLE I

| Basis, RN | Phase of Optical Pulse 301 | Phase of Optical Pulse 302 | Phase of Optical Pulse 303 | Phase of Optical Pulse 304 |
|---|---|---|---|---|
| +, 0 | 0 | $\pi$ | 0 | $\pi$ |
| +, 1 | 0 | $\pi$ | $\pi$ | 0 |
| ×, 0 | 0 | $\pi$ | $\pi/2$ | $3\pi/2$ |
| ×, 1 | 0 | $\pi$ | $3\pi/2$ | $\pi/2$ |

As shown in Table I, when the basis is "+" and the random number value is "0", a phase difference of 0 is given between the optical pulses 301 and 303. When the basis is "+" and the random number value is "1", a phase difference of $\pi$ is given between the optical pulses 301 and 303. When the basis is "×" and the random number value is "0", a phase difference of $\pi/2$ is given between the optical pulses 301 and 303. When the basis is "×" and the random number value is "1", a phase difference of $3\pi/2$ is given between the optical pulses 301 and 303. Moreover, a phase difference of the same size as that between the optical pulses 301 and 303 is given between the optical pulses 302 and 304. At the same time, a phase difference of $\pi$ is given between the optical pulses 301 and 302, and also between the optical pulses 303 and 304.

As described above, in a quantum key distribution system, an arbitrary phase modulation needs to be performed on each of the double pulses or quartet pulses. That is, it is necessary to apply a voltage for giving a required modulation to each of the phase modulators 102 and 206, which control the phase by using voltage, at the timing when each pulse is passing through the phase modulator. If the phase modulator is not driven at the right timing, a false pulse will be modulated. Therefore, it is necessary to control the timings of the clock signals for driving the phase modulators 102 and 206, and to check whether the timings are right.

1.2) Measurement of Extinction Ratio

Figure 8:
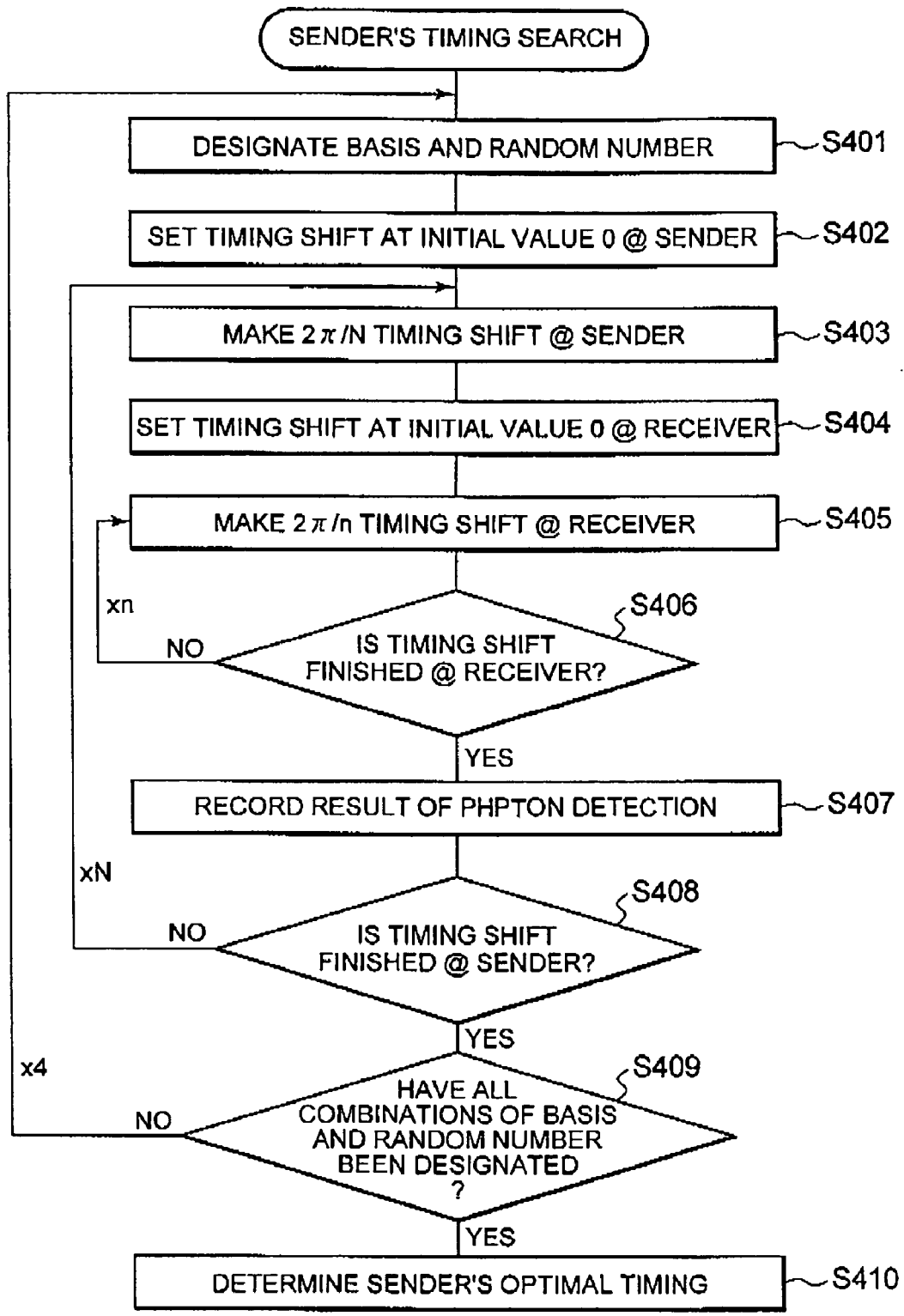
FIG. 8 is a flowchart showing a sender's timing search, including a procedure of measuring an extinction ratio at a receiver, in the system according to the first embodiment of the present invention.

FIG. 8 is a flowchart showing a search for the timing in the sender 10, including a procedure of measuring an extinction ratio at the receiver 20, in the system according to the first embodiment of the present invention. To check whether or not the timing of the clock signal CLK for driving the phase modulator 102 at the sender 10 is right, the extinction ratio needs to be measured at the receiver 20. Here, the extinction ratio is the ratio between the optical powers output to the photon detectors APD0 and APD1.

However, as mentioned already, a photon detector APD can only determine the presence or absence of the arrival of a photon but cannot directly measure the optical power, which is the time average of photon detections. Therefore, according to the present embodiment, the timing of the clock signal CLK2 for driving the photon detectors APD is sequentially shifted, whereby the optical powers are obtained indirectly from the results of photon detection achieved by the photon detectors each time a shift is made.

Referring to FIG. 8, first, the timing controller 240 controls the communication controller 230 so that one of the four combinations of a basis and a random number is selected, that the selected basis is set on the phase modulator 206 at the receiver 20, and that the selected combination of a basis and a random number value is notified for designation to the communication controller 130 at the sender 10 (S401). Upon this designation, the communication controller 130 outputs phase control signals to the phase modulator 102 and thereby sets the phase at modulation depths corresponding to the selected basis and random number value.

Subsequently, the timing controller 240 instructs the communication controller 130 at the sender 10 to reset a timing shift made for the timing of applying voltage to the phase modulator 102 at the sender 10 (S402). At this instruction, the synchronization block 110 resets the amount of the shift in the clock signal CLK to an initial value of zero.

Upon the initialization of the timing shift, the timing controller 240 instructs the communication controller 130 to make a timing shift, whereby the synchronization block 110, using a predetermined integer N, shifts the timing of applying voltage to the phase modulator 102 by $2\pi/N$. In accordance with this timing, voltages corresponding to the set phase modulations are applied (S403). Thus, each of the passing quartet optical pulses is modulated as described above and then sent back to the receiver 20 in the form of the double pulses.

In the receiver 20, the phase modulator 206 modulates the received double pulses, based on the basis designated as described above. The double pulses are made to interfere with each other at the optical coupler 203, and photon detection is performed by the photon detectors APD0 and APD1. At this time, it is necessary that bias voltage be raised only at the timing when a photon is coming in, for the photon detectors APD0 and APD1 to receive the photon. That is, it is necessary to drive the photon detectors APD with a clock signal the timing of which is coincident with the timing of the arrival of the photon. However, at this point in time, it is unknown at which timing in the full phase range ($2\pi$) of the clock signal, the photon comes in.

Therefore, the timing controller 240 instructs the communication controller 230 to reset a timing shift made for the timing of applying bias to the photon detectors APD0 and APD1 at the receiver 20. At this instruction, the synchronization block 210 resets the amount of the shift in the clock signal CLK2 to an initial value of zero (S404).

Next, the timing controller 240 instructs to shift the timing of the clock signal CLK2 to be output from the synchronization block 210, by one step. Using a predetermined integer n, the synchronization block 210 shifts the timing of applying bias to the photon detectors APD0 and APD1 by $2\pi/n$ (S405). With this shift, bias voltage is applied to the photon detectors APD0 and APD1 at the timing shifted by $2\pi/n$, and then photon detection is performed. Each time a photon is detected by any of the photon detectors, the number of photons detected by each photon detector is counted by the photon counter 260. The operation of counting the number of photons is repeated n times while the phase for the bias application timing is sequentially and continuously shifted by one step ($2\pi/n$) each time (S406).

When the amount of the shift reaches $2\pi$ in this manner, the number of photons counted until this point by the photon counter 260 for each of the photon detectors is stored in the memory 270, associated with the currently designated random number and basis and with the amount of the shift for the phase modulation timing, $\phi_i$ (i=1 to N), currently made at the sender 10 (S407). Here, as mentioned with reference to FIG. 4, the number of photons recorded in the memory 270 corresponds to the area of the region between t=0 and t=$2\pi$, which, in other words, means the optical power.

The timing controller 240 repeats the steps S403 to S407 N times (S408), in which each time the timing of applying voltage to the phase modulator 102 is shifted by $2\pi/N$, the timing of applying bias to the photon detectors APD0 and APD1 is sequentially shifted from 0 to $2\pi$ and the number of detected photons is counted. When these steps S403 to S407 have been repeated until the photon counts are measured for all the timings of applying voltage to the phase modulator 102 (YES at S408), the next basis and random number value are designated (S401), and then the above-described steps S402 to S408 are repeated.

The timing controller 240 performs the steps S401 to S408 for every one of the four combinations of a basis and a random number (S409). However, if an optimal point, which will be described later, can be found, it is not necessary to perform these steps for all the four combinations. When measurement is finished for the required combinations of a basis and a random number (YES at S409), the timing controller 240 determines the optimal timing in the sender 10, based on the respective photon counts of the photon detectors APD0 and APD1, recorded in the memory 270. The timing controller 240 notifies the communication controller 130 of this optimal timing, which is then set on the synchronization block 110 (S410).

1.3) Search for Clock Timing in Sender 10

Figure 9:
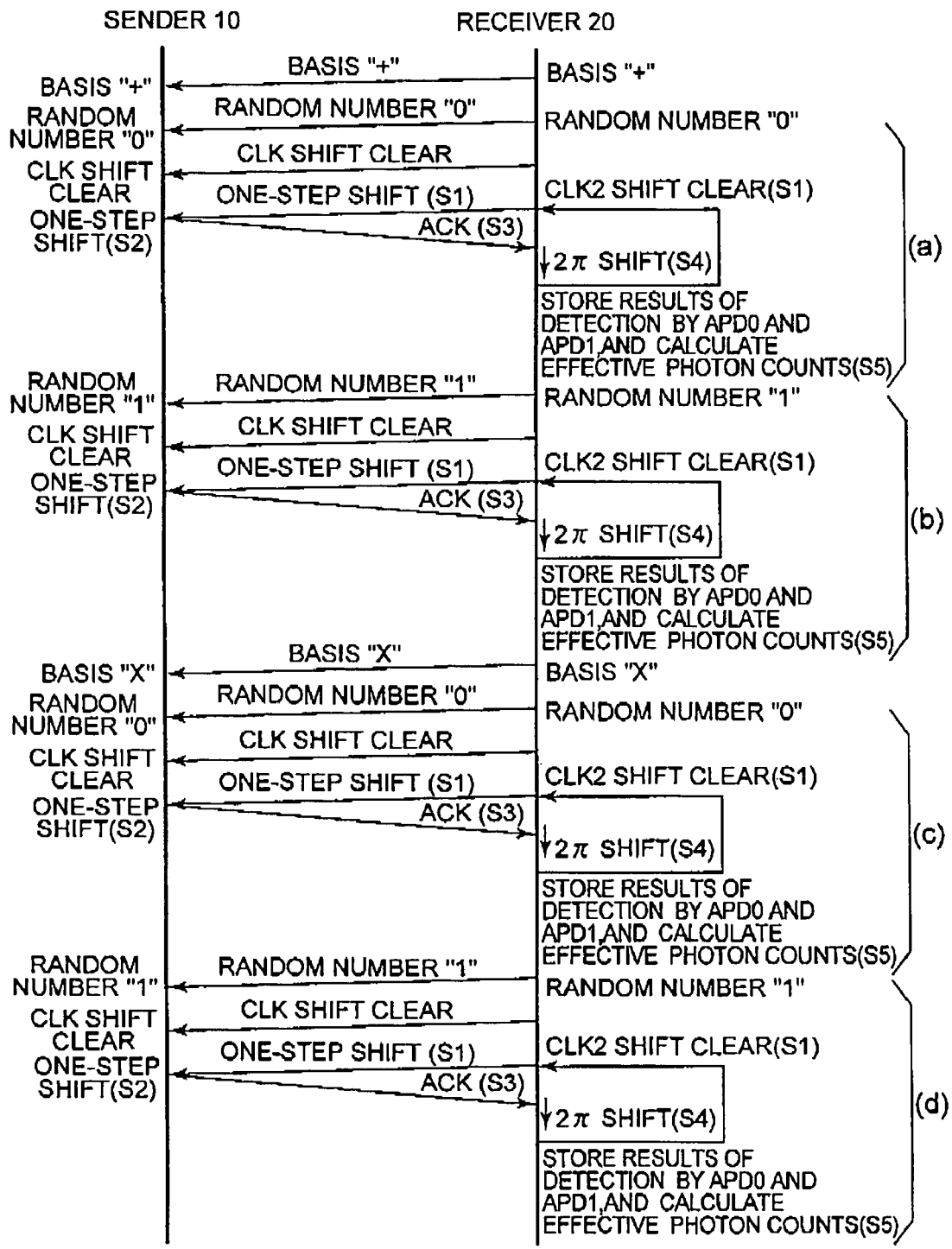
FIG. 9 is a handshake diagram showing a sequence of the control of the sender's timing, in which parts (a) to (d) correspond to four combinations of a basis and a random number, respectively.

FIG. 9 is a handshake diagram showing a timing control sequence of the sender, in which parts (a) to (d) correspond to the four combinations of a basis and a random number, respectively. FIGS. 10A to 10D are graphs corresponding to the four combinations of a basis and a random number, respectively, each showing variations in the effective photon counts and extinction ratio measured at the receiver.

a) Basis +, Random Number 0 (0 Modulation)

First, the timing controller 240 at the receiver 20 sets the reception basis of the phase modulator 206 at "+", and further instructs the communication controller 130 at the sender 10 to set the phase modulator 102 at modulation depths corresponding to the basis "+" and the random number "0". As a result, as shown in Table I mentioned before, the phases for phase modulation to be given to the individual quartet optical pulses are "0-$\pi$-0-$\pi$", in the order in which the quartet pulses pass through the phase modulator 102.

Since the phase modulator 102 at the sender 10 is driven in accordance with the clock signal supplied from the synchronization block 110, the timing at which the phase modulator 102 phase-modulates the optical pulses depends on the timing of supplying the clock signal. In accordance with instructions from the receiver 20, the synchronization block 110 can shift the timing of the clock signal from 0 to $2\pi$ by an arbitrary number of steps.

Subsequently, the timing controller 240 instructs to clear to zero the amount of the shift in the clock signal CLK of the synchronization block 110 at the sender 10. Then, the undermentioned steps S1 to S5 are repeated N times while the amount of the clock shift is increased by $2\pi/N$ each time, until it reaches $2\pi$.

Step S1: The timing controller 240 at the receiver 20 instructs the communication controller 130 at the sender 10 to shift the clock signal CLK of the synchronization block 110 by one step, and also instructs the communication controller 230 at the receiver 20 to clear to zero the amount of the shift in the clock signal CLK2 of the synchronization block 210.

Step S2: The communication controller 130 at the sender 10 has the synchronization-block 110 shift the clock signal CLK by one step. With this shift, the timing of driving the phase modulator 102 at the sender 10 is shifted by one step.

Step S3: With this one-step shift made at the sender 10, the optical powers observed by the photon detectors APD0 and APD1 at the receiver 20 are each changed.

Step S4: The communication controller 230 at the receiver 20 has the synchronization block 210 sequentially and continuously shift the clock signal CLK2 step by step from 0 to $2\pi$. With these shifts, the timing of driving the photon detectors APD0 and APD1 is sequentially and continuously changed from 0 to $2\pi$. During this operation, the photon counter 260 is incremented each time a photon is detected. Accordingly, when the clock signal CLK2 has been shifted from 0 to $2\pi$, the total photon count is stored in the photon counter 260. The photon count is stored without corresponding to the amount of the phase shift. This provides the advantage of high-speed processing and easy installation.

Step S5: The respective results of the photon detection by the photon detectors APD0 and APD1, counted by the photon counter 260, are stored in the memory 270. In this event, the photon counter 260 only counts photons that are detected while the clock signal CLK2 of the synchronization block 210 is being sequentially shifted in the step S4, and stores the detected photons in the memory 270 as an effective photon count. In other words, the effective photon count is a real count value excluding the number of photons counted by the photon counter 260 before the shifting of the phase of the clock signal CLK2 is started and after it is finished.

Figure 10:
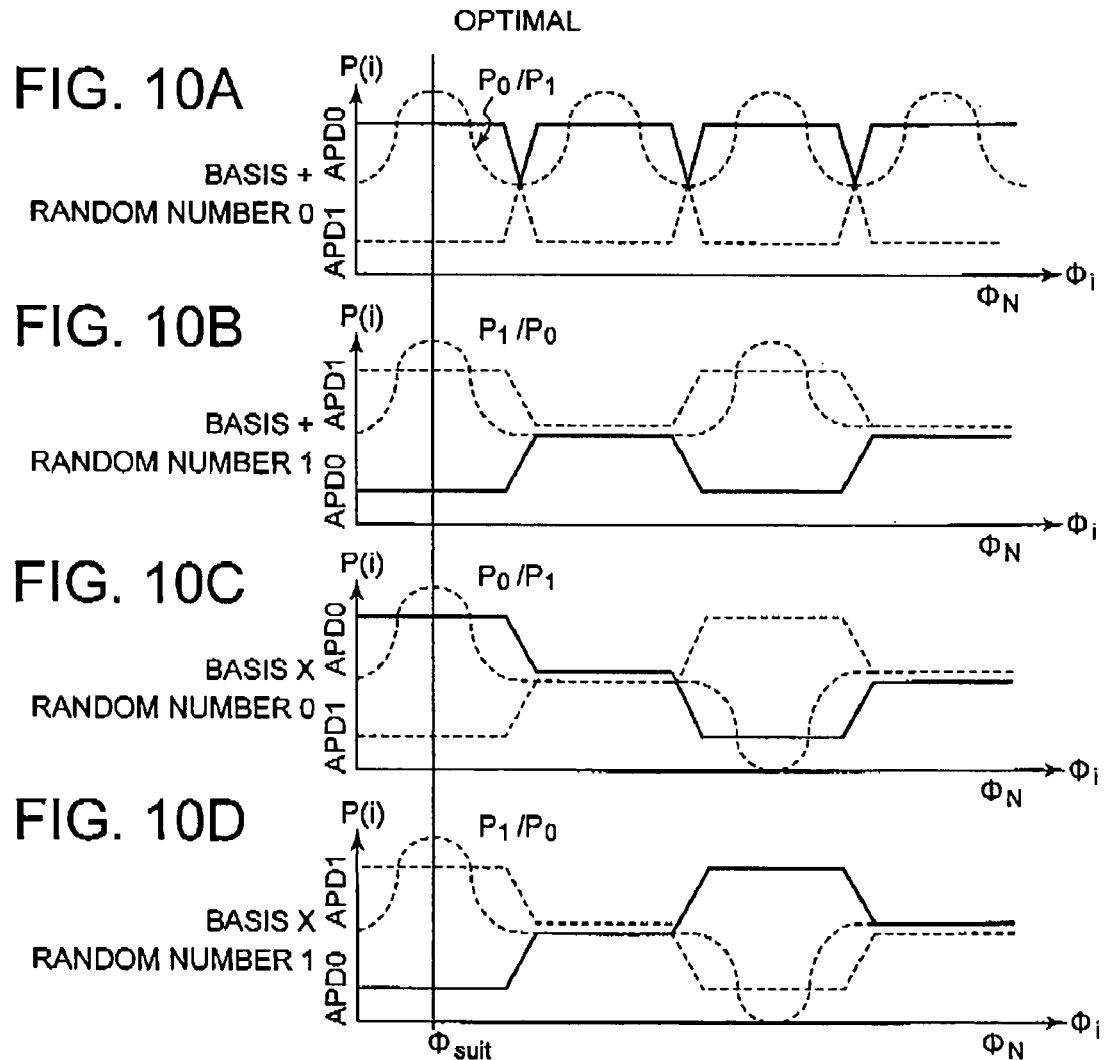
FIGS. 10A to 10D are graphs corresponding to the four combinations of a basis and a random number, respectively, each showing variations in the effective photon counts and extinction ratio measured at the receiver.

FIG. 10A shows the effective photon counts varying with the amount of the timing shift $\phi_i$ made at the sender 10, thus stored in the memory 270. In FIG. 10A, the horizontal axis represents the amount of the clock shift $\phi_i$ made at the sender 10, and the vertical axis represents the effective photon count of APD0 (solid line) and APD1 (dashed line).

From this graph, the extinction ratio (dotted line) can be obtained as the ratio of the effective photon count of the photon detector APD0 to the effective photon count of the photon detector APD1 ($P_0/P_1$). The reason for $P_0/P_1$ is that when the clock phase at the sender 10 is right, an optical pulse is detected by the photon detector APD0 but hardly by the photon detector APD1.

b) Basis +, Random Number 1 ($\pi$ Modulation)

The timing controller 240 at the receiver 20 instructs the communication controller 130 at the sender 10 to set the phase modulator 102 at modulation depths corresponding to the basis "+" and the random number "1", while leaving the basis in the receiver 20 at "+". As a result, as shown in Table I mentioned above, the phases for phase modulation to be given to the individual quartet optical pulses are "0-$\pi$-$\pi$-0", in the order in which the quartet pulses pass through the phase modulator 102.

Subsequently, the timing controller 240 instructs to clear to zero the amount of the shift in the clock signal CLK of the synchronization block 110 at the sender 10. Then, the above-described steps S1 to S5 are repeated N times while the amount of the clock shift at the sender 10 is increased by $2\pi/N$ each time, until it reaches $2\pi$. With these shifts, the optical powers observed by the photon detectors APD0 and APD1 at the receiver 20 are each changed. While the clock signal CLK2 at the receiver 20 is sequentially and continuously shifted, the effective photon counts are stored in the memory 270.

FIG. 10B shows the effective photon counts varying with the amount of the timing shift $\phi_i$ made at the sender 10, thus stored in the memory 270. In FIG. 10B, the horizontal axis represents the amount of the clock shift $\phi_i$ made at the sender 10, and the vertical axis represents the effective photon count of APD0 (solid line) and APD1 (dashed line).

From this graph, the extinction ratio (dotted line) can be obtained as the ratio of the effective photon count of the photon detector APD1 to the effective photon count of the photon detector APD0 ($P_1/P_0$). The reason for $P_1/P_0$ is that when the clock phase at the sender 10 is right, an optical pulse is detected by the photon detector APD1 but hardly by the photon detector APD0.

c) Basis ×, Random Number 0 ($\pi/2$ Modulation)

The timing controller 240 at the receiver 20 sets the reception basis of the phase modulator 206 at "×", and further instructs the communication controller 130 at the sender 10 to set the phase modulator 102 at modulation depths corresponding to the basis "×" and the random number "0". As a result, as shown in Table 1 mentioned above, the phases for phase modulation to be given to the individual quartet optical pulses are "0-$\pi$-$\pi/2$-$\pi/2$", in the order in which the quartet pulses pass through the phase modulator 102.

Subsequently, the timing controller 240 instructs to clear to zero the amount of the shift in the clock signal CLK of the synchronization block 110 at the sender 10. Then, the above-described steps S1 to S5 are repeated while the amount of the clock shift made at the sender 10 is increased by $2\pi/N$ each time, until it reaches $2\pi$. With these shifts, the optical powers observed by the photon detectors APD0 and APD1 at the receiver 20 are each changed. While the clock signal CLK2 at the receiver 20 is sequentially and continuously shifted, the effective photon counts are stored in the memory 270.

FIG. 10C shows the effective photon counts varying with the amount of the timing shift $\phi_i$ made at the sender 10, thus stored in the memory 270. In FIG. 10C, the horizontal axis represents the amount of the clock shift $\phi_i$ made at the sender 10, and the vertical axis represents the effective photon count of APD0 (solid line) and APD1 (dashed line).

From this graph, the extinction ratio (dotted line) can be obtained as the ratio of the effective photon count of the photon detector APD0 to the effective photon count of the photon detector APD0 ($P_0/P_1$). The reason for $P_0/P_1$ is that when the clock phase at the sender 10 is right, an optical pulse is detected by the photon detector APD0 but hardly by the photon detector APD1.

d) Basis ×, Random Number 1 ($3\pi/2$ Modulation)

The timing controller 240 at the receiver 20 instructs the communication controller 130 at the sender 10 to set the phase modulator 102 at modulation depths corresponding to the basis "×" and the random number "1", while leaving the basis in the receiver 20 at "×". As a result, as shown in Table 1 mentioned above, the phases for phase modulation to be given to the individual quartet optical pulses are "0-$\pi$-$3\pi/2$-$\pi/2$", in the order in which the quartet pulses pass through the phase modulator 102.

Subsequently, the timing controller 240 instructs to clear to zero the amount of the shift in the clock signal CLK of the synchronization block 110 at the sender 10. Then, the above-described steps S1 to S5 are repeated N times while the amount of the clock shift made at the sender 10 is increased by $2\pi/N$ each time, until it reaches $2\pi$. With these shifts, the optical powers observed by the photon detectors APD0 and APD1 at the receiver 20 are each changed. While the clock signal CLK2 at the receiver 20 is sequentially and continuously shifted, the effective photon counts are stored in the memory 270.

FIG. 10D shows the effective photon counts varying with the amount of the timing shift $\phi_i$ made at the sender 10, thus stored in the memory 270. In FIG. 10D, the horizontal axis represents the amount of the clock shift $\phi_i$ made at the sender 10, and the vertical axis represents the effective photon count of APD0 (solid line) and APD1 (dashed line).

From this graph, the extinction ratio (dotted line) can be obtained as the ratio of the effective photon count of the photon detector APD1 to the effective photon count of the photon detector APD0 ($P_1/P_0$). The reason for $P_1/P_0$ is that when the clock phase at the sender 10 is right, an optical pulse is detected by the photon detector APD1 but hardly by the photon detector APD0.

1.4) Determination of Optimal Timing in Sender

Referring to FIGS. 10A to 10D, the ratio between the optical powers detected by APD0 and APD1, that is, the extinction ratio is indicated by a dotted line. As described above, the extinction ratio is represented by $P_0/P_1$ when the random number "0" is sent, and is represented by $P_1/P_0$ when the random number "1" is sent. The effective photon counts output to the photon detectors APD0 and APD1 and the amount of the clock shift $\phi_i$ then made at the sender 10, are all stored in the memory 270 at the receiver 20. Based on this data, the timing controller 240 determines the optimal timing of the clock signal CLK at the sender 10.

FIG. 11 is a diagram schematically showing a data table of the ratios between the effective photon counts of the photon detectors APD0 and APD1 and the amounts of the clock shift, stored in the memory 270. That is, the observation data corresponding to the respective four combinations of a basis and a random number shown in FIGS. 10A to 10D is stored in the form of a table as shown in FIG. 11. Using this data table, the optimal timing is determined through the following procedure.

(1) The extinction ratio is calculated for each of the four types of modulation: (Ai, Bi, Ci, Di).

(2) The product of the four extinction ratios is calculated: (Ei=Ai*Bi*Ci*Di).

(3) A phase that makes maximum Ei is selected: ($\phi_i$ (max [E1, E2, . . . , EN])).

The amount of the shift $\phi_i$ determined in such a manner is a value $\phi_{suit}$ indicated by the "OPTIMAL" line in FIGS. 10A to 10D. The clock signal CLK shifted by this amount provides the optimal timing synchronizing with the optical pulses. However, as mentioned already, if it is possible to obtain the optimal line, there is no need to use all the observation data corresponding to the four combinations shown in FIGS. 10A to 10D.

1.5) Advantages

As described above, according to the present embodiment, first, the timing for the phase modulator 102 at the sender 10 is shifted on a step-by-step basis in accordance with the control from the receiver 20. Each time a shift is made, the timing of raising bias to be applied to the photon detectors at the receiver 20 is sequentially and continuously shifted from 0 to 2π, and the results of photon detection are stored in the memory 270. In the results of the photon detection, only the photons that are detected while the timing of raising bias is being sequentially shifted are processed as the effective photon counts. Based on these effective photon counts, the optimal timing of the phase modulation at the sender 10 is determined. Accordingly, it is possible for the receiver side to check, by using the photon detectors APD, whether or not the timing of the phase modulation at the sender 10 is right. Thus, stable phase modulation can be performed in the sender 10. In the case of applying the present embodiment to a quantum key distribution system, it is possible to achieve high-speed, stable key generation.

2. Second Embodiment

Figure 12:
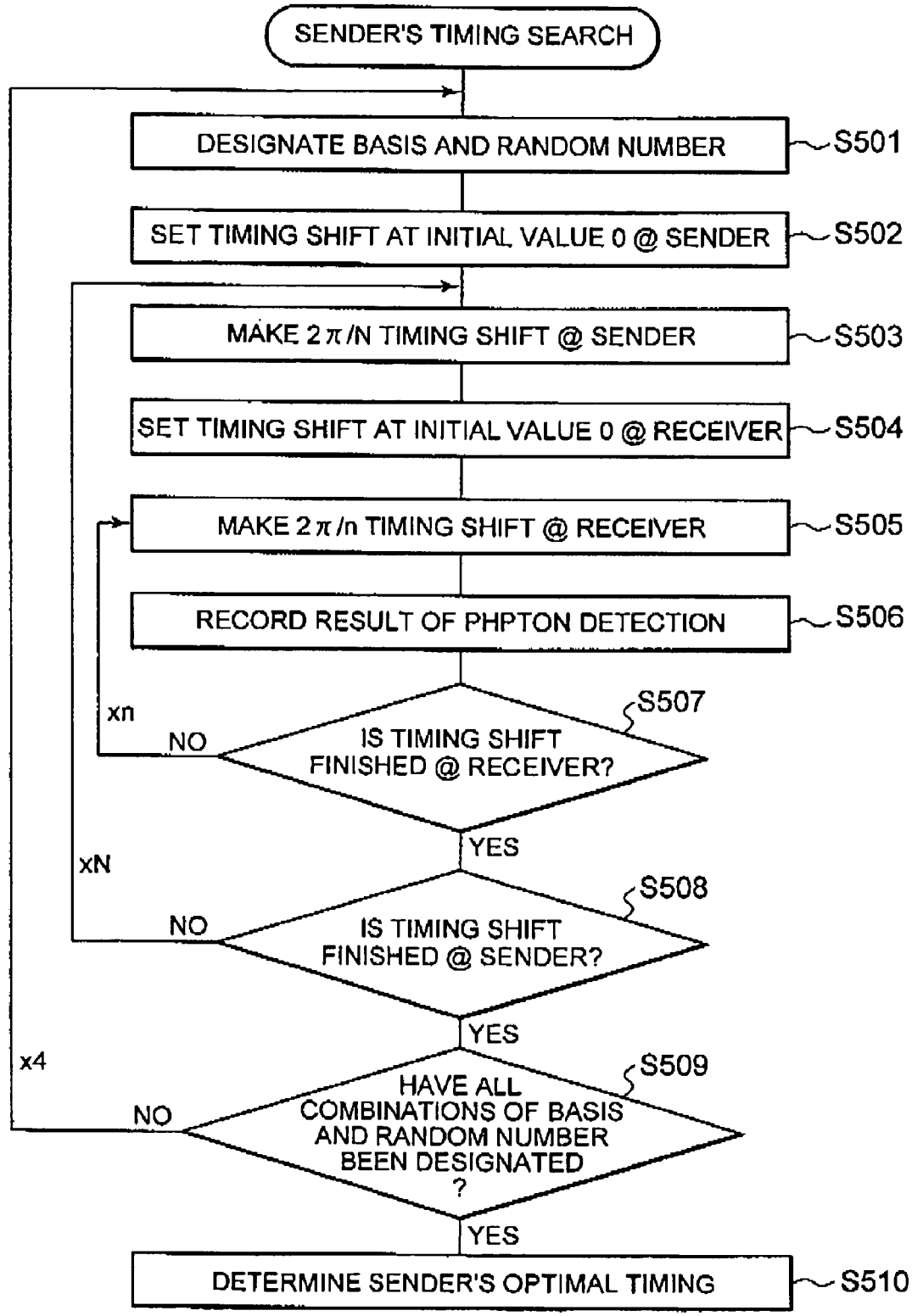
FIG. 12 is a flowchart showing a procedure of the control of the sender's timing, in a quantum cryptographic system according to a second embodiment of the present invention.

FIG. 12 is a flowchart showing a procedure of the control of the sender's timing, in a quantum cryptographic system according to a second embodiment of the present invention. The block configuration of the quantum cryptographic system according to the second embodiment is similar to that of the first embodiment as shown in FIG. 5. The optical pulses to be sent and received behave as in the first embodiment, as described based on FIGS. 6 and 7. Therefore, a description of the parts overlapping with the first embodiment will be omitted. With reference to FIGS. 5 and 12, operations of determining the extinction ratio, of searching for the sender's clock timing, and of determining the optimal timing will be described in detail.

2.1) Measurement of Extinction Ratio

The timing controller 240 controls the communication controller 230 so that one of the four combinations of a basis and a random number is selected, that the selected basis is set on the phase modulator 206 at the receiver 20, and that the selected combination of a basis and a random number value is notified for designation to the communication controller 130 at the sender 10 (S501). With this designation, the communication controller 130 outputs phase control signals to the phase modulator 102, thereby setting the phase at modulation depths corresponding to the selected basis and random number value.

Subsequently, the timing controller 240 instructs the communication controller 130 at the sender 10 to reset a timing shift made for the timing of applying voltage to the phase modulator 102 at the sender 10 (S502). At this instruction, the synchronization block 110 resets the amount of the shift in the clock signal CLK to an initial value of zero.

Upon the initialization of the timing shift, the timing controller 240 instructs the communication controller 130 to make a timing shift. At this instruction, the synchronization block 110, using a predetermined integer N, shifts the timing of applying voltage to the phase modulator 102 by 2π/N, and voltages corresponding to the set phase modulations are applied in accordance with this timing (S503). Thus, the passing quartet optical pulses are individually modulated as described above and then returned to the receiver 20 in the form of the double pulses.

In the receiver 20, the received double pulses are modulated by the phase modulator 206 with the basis designated as described above and made to interfere with each other at the optical coupler 203, and then photon detection is performed by the photon detectors APD0 and APD1. At this time, it is necessary that bias voltage be raised only at the timing when a photon is coming in, for the photon detectors APD0 and APD1 to receive the photon. That is, it is necessary to drive the photon detectors APD with a clock signal the timing of which is coincident with the timing of the arrival of the photon. However, at this point in time, it is unknown at which timing in the full phase range (2π) of the clock signal, the photon comes in.

Therefore, the timing controller 240 instructs to reset a timing shift made for the timing of applying bias to the photon detectors APD0 and APD1 at the receiver 20 (S504). With this instruction, the synchronization block 210 resets the amount of the shift in the clock signal CLK2 to an initial value of zero.

Next, the timing controller 240 instructs to shift the timing of applying bias to the photon detectors APD0 and APD1 by 2π/n (S505). A photon detected by the photon detector APD0 or APD1 during this bias application is counted by the photon counter 260. The count is stored in the memory 270, associated with the currently designated random number and basis, the amount of the timing shift $\phi_i$ (i=1 to N) currently set at the sender 10, and the current amount of the shift $\theta_j$ (j=1 to n) in the clock signal CLK2 (S506).

Leaving the timing of applying voltage to the phase modulator 102 at the sender 10 unchanged, the timing controller 240 repeats the above-described steps S505 and S506 while shifting the timing of applying bias to the photon detectors APD0 and APD1 by 2π/n each time, until the photon counts are recorded in the memory 270 for all the bias application timings (S507).

When the timing shift at the receiver 20 is finished (YES at S507), the timing controller 240 instructs to shift the timing of applying voltage to the phase modulator 102 at the sender 10 by 2π/N (S508 and S503) and again repeats the steps S505 and S506. The steps S503 to S507 are repeated until the photon counts are measured for all the voltage application timings, whereby photon detection and photon counting are performed for the currently selected basis and random number value (S508).

The timing controller 240 performs the above-described steps S501 to S508 for every one of the four combinations of a basis and a random number (S509). When measurement is finished for all the four combinations of a basis and a random number (YES at S509), the timing controller 240 determines the optimal timing in the sender 10, based on the photon counts of the photon detectors APD0 and APD1, recorded in the memory 270, and notifies the optimal timing to the communication controller 130 at the sender 10 to set it on the synchronization block 110 (S510).

2.2) Search for Clock Timing in Sender

Figure 13:
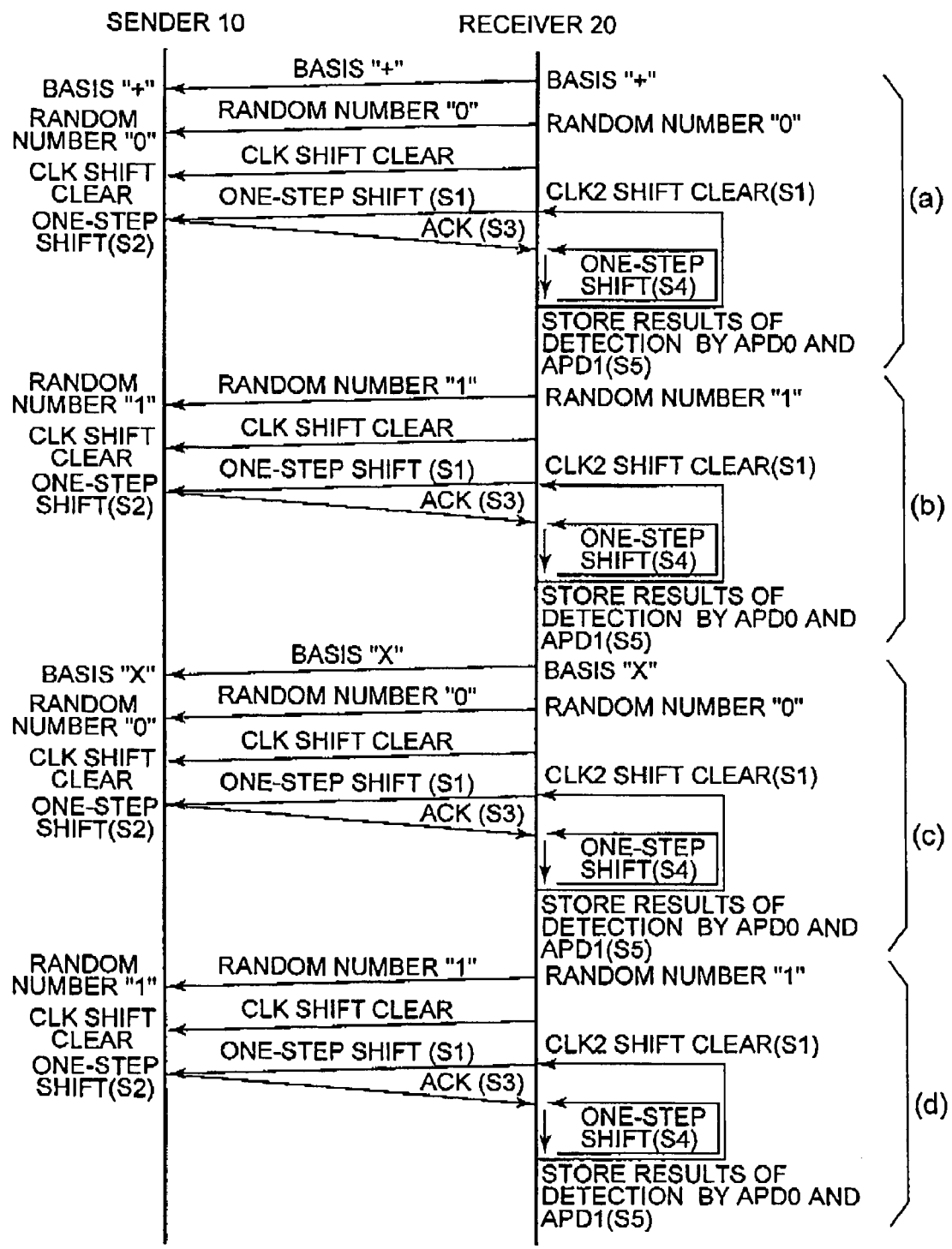
FIG. 13 is a handshake diagram showing a sequence of the control of the sender's timing, in which parts (a) to (d) correspond to the four combinations of a basis and a random number, respectively.

FIG. 13 is a handshake diagram showing a sequence of the control of the sender's timing, in which parts (a) to (d) correspond to the four combinations of a basis and a random number, respectively.

a) Basis +, Random Number 0 (0 Modulation)

First, the timing controller 240 at the receiver 20 sets the reception basis of the phase modulator 206 at "+", and further instructs the communication controller 130 at the sender 10 to set the phase modulator 102 at modulation depths corresponding to the basis "+" and the random number "0". As a result, as shown in Table I mentioned above, the phases for phase modulation to be given to the individual quartet optical pulses are "0-π-0-π", in the order in which the quartet pulses pass through the phase modulator 102.

Since the phase modulator 102 at the sender 10 is driven in accordance with the clock signal CLK supplied from the synchronization block 110, the timing at which the phase modulator 102 phase-modulates the optical pulses depends on the timing of supplying the clock signal CLK. In accordance with instructions from the receiver 20, the synchronization block 110 can shift the timing of the clock signal CLK from 0 to $2\pi$ by an arbitrary number of steps.

Subsequently, the timing controller 240 instructs to clear to zero the amount of the shift in the clock signal CLK of the synchronization block 110 at the sender 10. Then, the undermentioned steps S1 to S5 are repeated N times while the amount of the clock shift is increased by $2\pi/N$ each time, until it reaches $2\pi$.

Step S1: The timing controller 240 at the receiver 20 instructs the communication controller 130 at the sender 10 to shift the clock signal CLK of the synchronization block 110 by one step, and also instructs the communication controller 230 in the receiver 20 to clear to zero the amount of the shift in the clock signal CLK2 of the synchronization block 210.

Step S2: The communication controller 130 at the sender 10 has the synchronization block 110 shift the clock signal CLK by one step. With this shift, the timing of driving the phase modulator 102 at the sender 10 is shifted by one step.

Step S3: With the one-step shift at the sender 10, the optical powers observed by the photon detectors APD0 and APD1 at the receiver 20 are each changed.

Step S4: The communication controller 230 at the receiver 20 has the synchronization block 210 shift the clock signal CLK2 by one step. The amount of a clock shift per step is assumed to be $2\pi/n$.

Step S5: When a photon is detected by the photon detector APD0 or APD1, this detection is counted by the photon counter 260, and the count value is stored in the memory 270. Thereafter, the steps S4 and S5 are repeated n times until the amount of the shift in the clock signal CLK2 becomes $2\pi$ in the step S4.

Accordingly, each time the clock signal CLK at the sender 10 is shifted by one step ($2\pi/N$), the clock signal CLK2 at the receiver 20 is sequentially shifted step by step from 0 to $2\pi$, wherein each time the clock signal CLK2 is shifted by one step, the count value made by the photon counter 260 is stored in the memory 270, associated with the then amount of the phase shift $\theta_j$.

b) Basis +, Random Number 1 (× Modulation)

The timing controller 240 at the receiver 20 instructs the communication controller 130 at the sender 10 to set the phase modulator 102 at modulation depths corresponding to the basis "+" and the random number "1", while leaving the basis in the receiver 20 at "+". As a result, as shown in Table I mentioned above, the phases for phase modulation to be given to the individual quartet optical pulses are "0-π-π-0", in the order in which the quartet pulses pass through the phase modulator 102.

Subsequently, the timing controller 240 instructs to clear to zero the amount of the shift in the clock signal CLK of the synchronization block 110 at the sender 10. Then, the above-described steps S1 to S5 are repeated N time while the amount of the clock shift at the sender 10 is increased by $2\pi/N$ each time, until it reaches $2\pi$. Accordingly, each time the clock signal CLK at the sender 10 is shifted by one step ($2\pi/N$), the clock signal CLK2 at the receiver 20 is sequentially shifted step by step from 0 to $2\pi$, wherein each time the clock signal CLK2 is shifted by one step, the count value made by the photon counter 260 is stored in the memory 270, associated with the then amount of the phase shift $\theta_j$.

c) Basis ×, Random Number 0 ($\pi/2$ Modulation)

The timing controller 240 at the receiver 20 sets the reception basis of the phase modulator 206 at "×", and further instructs the communication controller 130 at the sender 10 to set the phase modulator 102 at modulation depths corresponding to the basis "×" and the random number "0". As a result, as shown in Table I mentioned above, the phases for phase modulation to be given to the individual quartet optical pulses are "0-π-π/2-3π/2", in the order in which the quartet pulses pass through the phase modulator 102.

Subsequently, the timing controller 240 instructs to clear to zero the amount of the shift in the clock signal CLK of the synchronization block 110 at the sender 10. Then, the above-described steps S1 to S5 are repeated N times while the amount of the clock shift is increased by $2\pi/N$ each time, until it reaches $2\pi$. Accordingly, each time the clock signal CLK at the sender 10 is shifted by one step ($2\pi/N$), the clock signal CLK2 at the receiver 20 is sequentially shifted step by step from 0 to $2\pi$, wherein each time the clock signal CLK2 is shifted by one step, the count value made by the photon counter 260 is stored in the memory 270, associated with the then amount of the phase shift $\theta_j$.

d) Basis ×, Random Number 1 ($3\pi/2$ Modulation)

The timing controller 240 at the receiver 20 instructs the communication controller 130 at the sender 10 to set the phase modulator 102 at modulation depths corresponding to the basis "×" and the random number "1", while leaving the basis in the receiver 20 at "×". As a result, as shown in Table I mentioned above, the phases for phase modulation to be given to the individual quartet optical pulses are "0-π-3π/2-π/2", in the order in which the quartet pulses pass through the phase modulator 102.

Subsequently, the timing controller 240 instructs to clear to zero the amount of the shift in the clock signal CLK of the synchronization block 110 at the sender 10. Then, the above-described steps S1 to S5 are repeated N time while the amount of the clock shift at the sender 10 is increased by $2\pi/N$ each time, until it reaches $2\pi$. Accordingly, each time the clock signal CLK at the sender 10 is shifted by one step ($2\pi/N$), the clock signal CLK2 at the receiver 20 is sequentially shifted step by step from 0 to $2\pi$, wherein each time the clock signal CLK2 is shifted by one step, the count value made by the photon counter 260 is stored in the memory 270, associated with the then amount of the phase shift $\theta_j$.

2.3) Determination of Optimal Timing in Sender

First, the ratio between the optical powers observed by the photon detectors APD0 and APD1, that is, the extinction ratio is obtained. To do so, it is necessary to obtain the optical powers output to the photon detectors APD0 and APD1 when the amount of the timing shift at the sender 10 is $\phi_i$. When the amount of the timing shift at the sender 10 is $\phi_i$, the bias application timing at the receiver 20 is shifted n times, by $2\pi/n$ each time. Assuming that $c_0(i, j)$ and $c_1(i, j)$ are the photon counts of the photon detectors APD0 and APD1, respectively, made when the j-th shifting is performed, then the optical powers $P_0(i)$ and $P_1(i)$ observed by APD0 and APD1, respectively, when the amount of the timing shift at the sender 10 is $\phi_i$, can be represented by the following equations, respectively:

$$P_0(i) = \sum_{j=1}^{n} c_0(i, j) \quad (1)$$

$$P_1(i) = \sum_{j=1}^{n} c_1(i, j) \quad (2)$$

The optical powers thus obtained vary with the amount of the timing shift $\phi_i$ at the sender 10 as shown in FIG. 10A. In FIGS. 10A to 10D, the horizontal axes represent the amount of the clock shift $\phi_i$ at the sender, and the vertical axes represent the optical power observed by APD0 (solid line) and by APD1 (dashed line). From these graphs, as described above, the ratio between the optical powers observed by the photon detectors APD0 and APD1, that is, the extinction ratio can be obtained (dotted line).

The extinction ratio is expressed as $P_0/P_1$ when the random number "0" is sent, and is expressed as $P_1/P_0$ when the random umber "1" is sent. The optical powers output to the photon detectors APD0 and APD1 and the amount of the clock shift $\phi_i$ then made at the sender 10 are all stored in the memory 270 at the receiver 20. Based on this data, the optimal timing of the clock signal CLK at the sender 10 is determined. The determination method is as described with reference to FIG. 11.

2.4) Advantages

As described above, according to the second embodiment of the present invention, each time the clock signal CLK at the sender 10 is shifted by one step ($2\pi/N$), the clock signal CLK2 at the receiver 20 is sequentially shifted step by step from 0 to $2\pi$. Therefore, the optical powers can be measured as in the first embodiment.

Moreover, according to the second embodiment, each time the clock signal CLK2 is shifted by one step, the count value made by the photon counter 260 is stored in the memory 270, associated with the then amount of the phase shift $\theta_j$. Accordingly, it is possible to record how the photon counts vary while the clock signal CLK2 is shifted from 0 to $2\pi$. For example, it is possible to see that the photon counts vary as shown in FIG. 4.

3. Third Embodiment

As described above, according to the second embodiment, each time the clock signal CLK2 is shifted by one step, the count value made by the photon counter 260 and the then amount of the phase shift are stored in the memory 270, associated with each other. According to a third embodiment, by utilizing this data stored in the memory 270, not only the extinction ratio can be measured, but also the optimal timing can be determined for each of the sender and the receiver. Hereinafter, the third embodiment will be described in detail.

Figure 14:
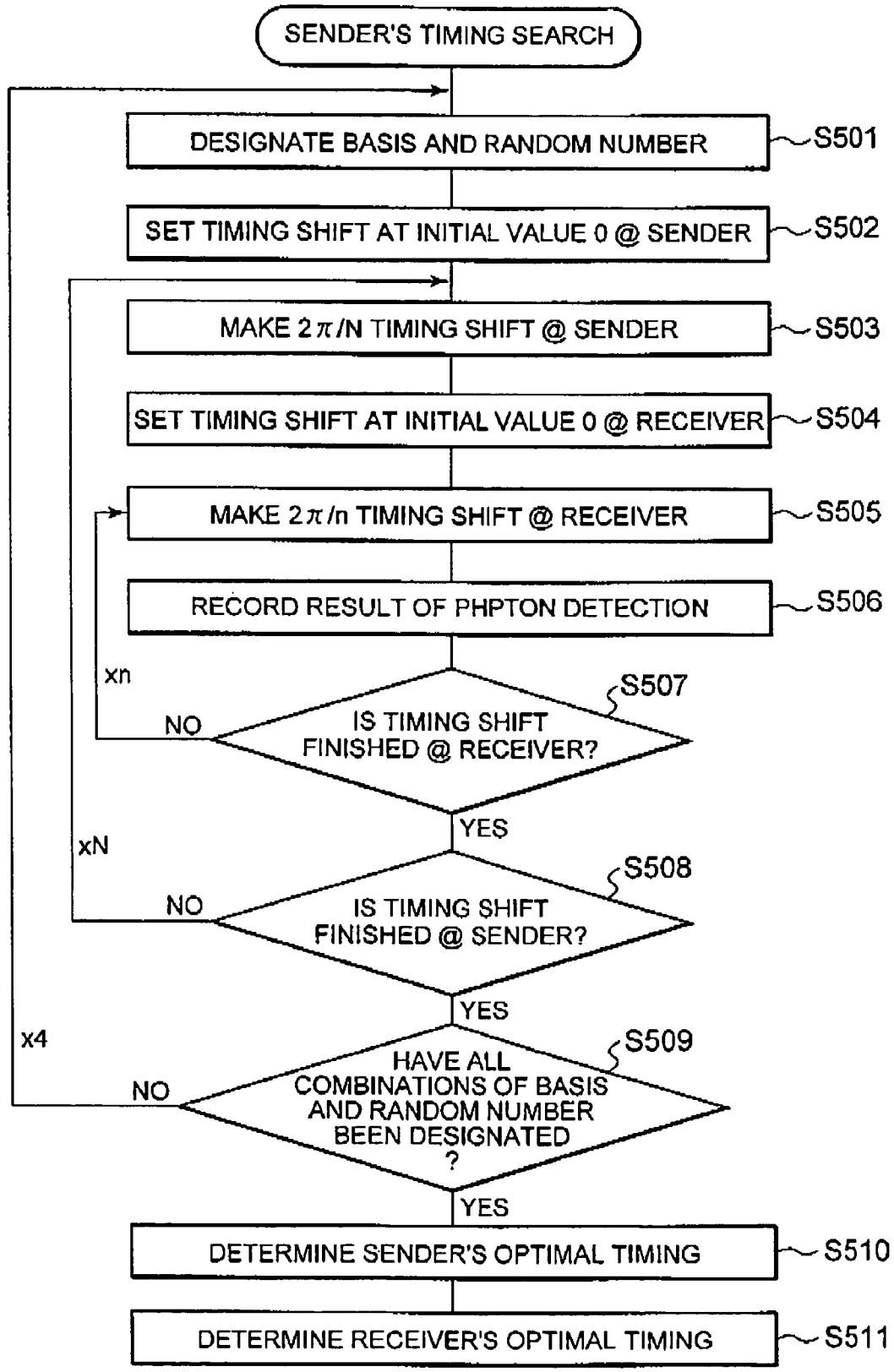
FIG. 14 is a flowchart showing a procedure of the control of the sender's timing, in a quantum cryptographic system according to a third embodiment of the present invention.

FIG. 14 is a flowchart showing a procedure of the control of the sender's timing, in a quantum cryptographic system according to the third embodiment of the present invention. The block configuration of the quantum cryptographic system according to the third embodiment is similar to that of the first embodiment as shown in FIG. 5. The optical pulses to be sent and received behave as in the first embodiment, as described based on FIGS. 6 and 7.

Moreover, sender's timing search operations in the third embodiment are similar to the steps S501 to S509 described with reference to FIG. 12. Therefore, these parts are denoted by the same reference numerals and symbols as in FIG. 12, and a description thereof will be omitted. Hereinafter, the determination of the optimal timing in the sender (S510) and the determination of the optimal timing in the receiver (S511) will be described. Note that the control of the timing in the sender 10 is all performed in accordance with instructions from the timing controller 240 at the receiver 20.

3.1) Determination of Optimal Timing in Sender

FIGS. 15A to 15D are graphs corresponding to the four combinations of a base and a random number, respectively, each showing variations in the effective photon counts and extinction ratio measured at the receiver. The horizontal axes represent the amount of a timing shift $\phi_i$ (i=1 to N) at the sender 10, and the vertical axes represent the optical power (photon count) observed by the photon detectors APD0 and APD1. Here, the optical power observed by the photon detector APD0 is shown by a solid line, and the optical power observed by the photon detector APD1 is shown by a dashed line.

As described above, when the amount of the timing shift at the sender 10 is $\phi_i$, the bias application timing at the receiver 20 is shifted n times, by $2\pi/n$ each time (S505 to S507). Assuming that $c_0(i, j)$ and $c_1(i, j)$ are the photon counts of the photon detectors APD0 and APD1, respectively, made when the j-th shifting is performed, then the optical powers $P_0(i)$ and $P_1(i)$ observed by APD0 and APD1, respectively, when the amount of the timing shift at the sender 10 is $\phi_i$, can be represented by the above-mentioned equations (1) and (2), respectively.

Figure 15A:
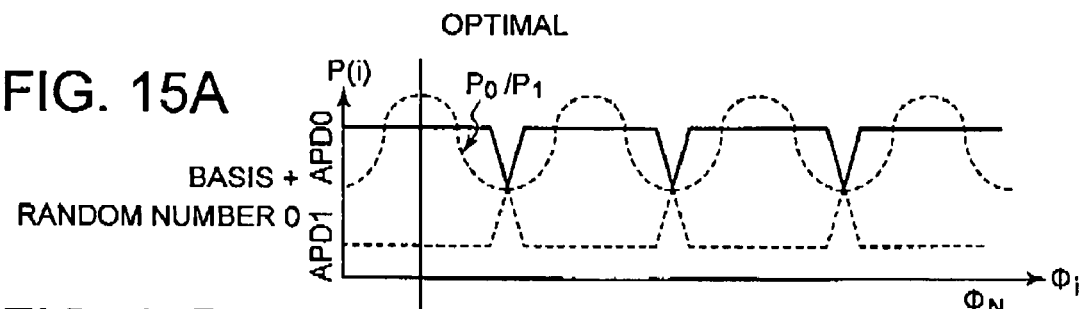
FIGS. 15A to 15D are graphs corresponding to the four combinations of a basis and a random number, respectively, each showing variations in the effective photon counts and extinction ratio measured at the receiver.
Figure 15B:
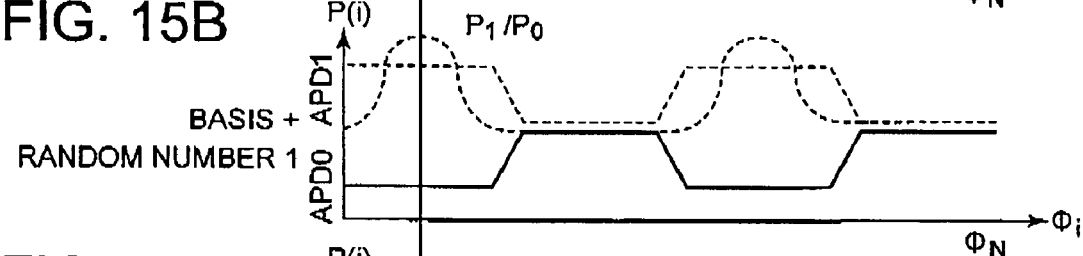
Figure 15C:
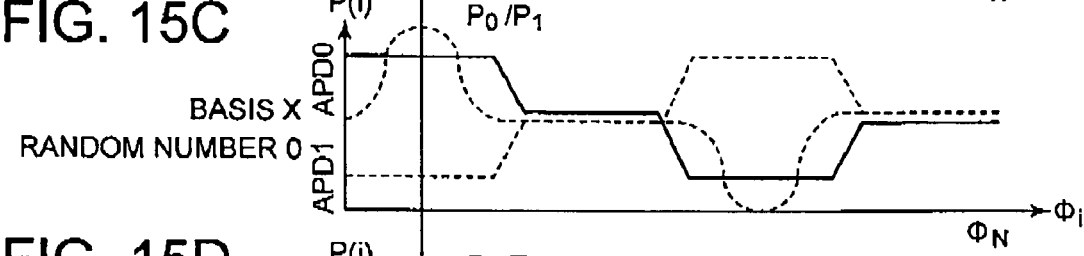
Figure 15D:
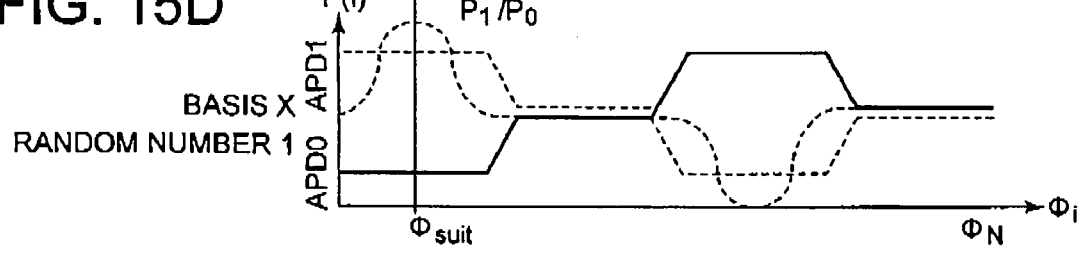

The optical powers thus obtained vary with the amount of the timing shift $\phi_i$ at the sender 10 as shown in FIG. 15A (same as FIG. 10A). From this graph, as described above, the ratio between the optical powers observed by the photon detectors APD0 and APD1, that is, the extinction ratio can be obtained (dotted line). As for FIGS. 15B to 15D, the description given with FIGS. 10B to 10D applies, respectively.

Moreover, the optical powers output to the photon detectors APD0 and APD1 and the amount of the clock shift $\phi_i$ then made at the sender 10 are all stored in the memory 270 at the receiver 20. Based on this data (see FIG. 17A) on the amount of the phase shift and the then optical powers (photon counts), the optimal timing of the clock signal CLK at the sender 10 can be determined. The determination method is as described with reference to FIG. 11.

3.2) Determination of Optimal Timing in Receiver

Once the optimal timing, $\phi_{suit}$, of the clock signal CLK at the sender 10 is determined as described above (S510), the optimal timing in the receiver 20 is subsequently determined by using the measurement data stored in the memory 270 (S511).

Figure 16A:
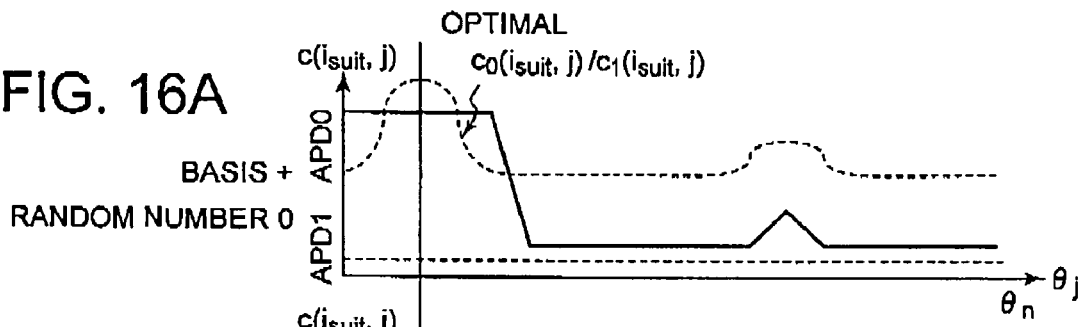
FIGS. 16A to 16D are graphs corresponding to the four combinations of a basis and a random number, respectively, each showing variations in the photon counts detected at the receiver.

FIGS. 16A to 16D are graphs corresponding to the four combinations of a base and a random number, respectively, each showing variations in the photon counts detected at the receiver. FIG. 16A shows the observation values varying with the amount of the timing shift $\theta_j$ (j=1 to n) at the receiver 20, stored in the memory 270, for the combination of the basis "+" and the random number "0". In FIGS. 16A to 16D, the horizontal axes represent the amount of the timing shift $\theta_j$ at the receiver 20, and the vertical axes represent the result of photon detection observed by APD0 (solid line) and by APD1 (dashed line).

Figure 16B:
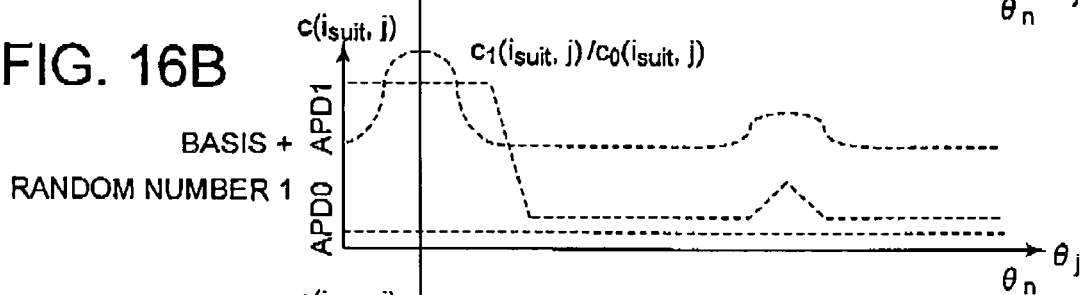
Figure 16C:
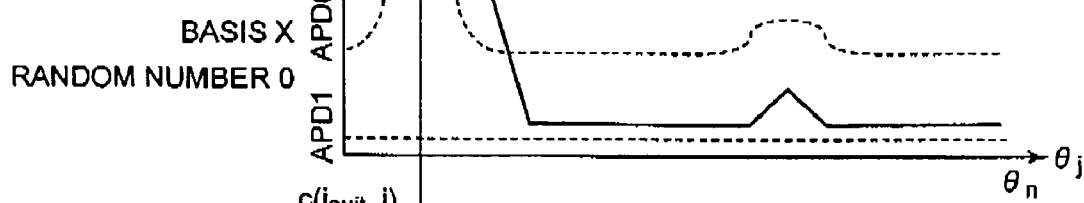
Figure 16D:
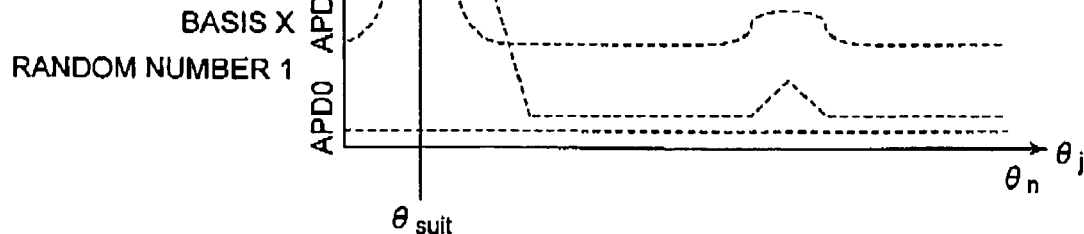

Referring to FIG. 16A, when the clock phase is right, a photon is detected by APD0 because the random number value sent from the sender 10 is "0". When the clock phase deviates, no photon is detected. Similarly, FIGS. 16B to 16D show observation values varying with the amount of the timing shift $\theta_j$, in the case of the basis "+" and the random number "1", in the case of the basis "×" and the random number "0", and in the case of the basis "×" and the random number "1", respectively.

In FIGS. 16A to 16D, the ratio between the photon counts of APD0 and APD1, that is, the photon detection ratio is shown by a dotted line. In the case where $\phi=\phi_{suit}$ ($\phi$ is the timing of the clock signal CLK at the sender 10), since light should be output to APD0 when the random number "0" is sent, the ratio of the observation value obtained by APD0 to the observation value obtained by APD1, $c_0(i_{suit},j)/c_1(i_{suit},j)$, is represented as photon detection. Moreover, when the random number "1" is sent, since light should be output to APD1, the ratio of the observation value obtained by APD1 to the observation value obtained by APD0, $c_1(i_{suit},j)/c_0(i_{suit},j)$, is represented as photon detection.

FIG. 17A is a diagram schematically showing a data table of the ratios between the photon counts of the photon detectors APD0 and APD1 and the amounts of the clock shift on the sender side, stored in the memory 270. FIG. 17B is a diagram schematically showing a data table of the ratios between the photon counts of the photon detectors APD0 and APD1 and the amounts of the clock shift on the receiver side, stored in the memory 270. As shown in FIG. 17B, the optical powers output to APD0 and APD1 and the amount of the clock shift $\theta_j$ then made at the receiver 20 are all stored in the memory 270. Therefore, the optimal timing of the clock signal at the receiver 20 can be determined based on this data. Since the determination method is similar to the method in the case of the sender 10 as described with reference to FIG. 11, a description thereof will be omitted.

The present invention is applicable to optical power measurement equipment in general that measures the optical power in very weak optical communications. Moreover, the present invention can be applied not only to plug and play two-way systems as described above, but also to one-way quantum cryptographic systems. Furthermore, the application of the present invention is not limited to the quantum key distribution, but the present invention is applicable to all the systems and schemes in quantum cryptographic communications.

The invention claimed is:

1. An apparatus for measuring optical power of a series of optical pulses, comprising:
    a photon detector for detecting photon arrival according to driving timing having time intervals each corresponding to a constant period of time;
    a counter for counting a number of photons detected by the photon detector; and
    a measurement section for measuring optical power of the series of optical pulses from a time average of the number of photons counted by the counter in each of the time intervals while phase-shifting the driving timing in steps of a predetermined amount of phase within a predetermined phase range which is substantially coincident with a period of the optical pulses.

2. The apparatus according to claim 1, wherein the measurement section measures the optical power of the series of optical pulses based on the number of photons obtained for a period of time corresponding to a plurality of time intervals at the driving timing for each phase shift.

3. The apparatus according to claim 1, wherein the measurement section sequentially and continuously shifts the driving timing in steps of the predetermined amount of phase and, when the driving timing has been completely shifted over the predetermined phase range, measures the optical power based on the number of photons counted, and wherein the predetermined phase range corresponds to 360 degrees.

4. The apparatus according to claim 1, wherein the measurement section sequentially shifts the driving timing in steps of the predetermined amount of phase to store in a memory the number of photons obtained at the driving timing for each phase shift and, when the driving timing has been completely shifted over the predetermined phase range, measures the optical power based on the number of photons stored in the memory, and wherein the predetermined phase range corresponds to 360 degrees.

5. The apparatus according to claim 1, further comprising a timing controller for controlling a phase shift of the driving timing,
    wherein the measurement section stores in a memory the number of photons counted by the counter at the driving timing for each phase shift while sequentially shifting the driving timing, and measures the optical power based on the number of photons stored in the memory.

6. The apparatus according to claim 5, wherein the measurement section sequentially stores in the memory an amount of phase shift of the driving timing and the number of photons corresponding to the amount of phase shift.

7. The apparatus according to claim 6, wherein the optical power of the series of optical pulses is obtained from a total number of photons corresponding to the amount of phase shift over the predetermined phase range.

8. The apparatus according to claim 1, wherein the photon detector is an optoelectronic device to which a bias voltage is applied according to the driving timing, wherein the optoelectronic device can detect an incident photon for a duration of applying the bias voltage.

9. The apparatus according to claim 1, wherein each of the optical pulses is a pulse of very weak light which is 1 photon/pulse or less.

10. An optical communication system for transmitting information between a first communication device and a second communication device through a plurality of communication channels, wherein
    the first communication device comprises:
    a modulator for modulating a series of optical pulses according to original information to be transmitted, at given modulation timing to transmit the series of modulated optical pulses through a first communication channel; and
    a timing supplier for supplying the modulation timing to the modulator, wherein the modulation timing is changeable, and the second communication device comprises:
- a photon detector for detecting photon arrival of the series of optical pulses through the first communication channel according to driving timing having time intervals each corresponding to a constant period of time;
- a counter for counting a number of photons detected by the photon detector;
- a measurement section for measuring optical power of the series of optical pulses from a time average of the number of photons counted by the counter in each of the time intervals while phase-shifting the driving timing in steps of a predetermined amount of phase within a predetermined phase range which is substantially coincident with a period of the optical pulses; and
- a timing controller for controlling the modulation timing of the first communication device through a second communication channel based on the optical power measured by the measurement section.

11. The optical communication system according to claim 10, wherein the timing controller monitors the optical power measured by the measurement section while shifting the modulation timing along time axis, to search for the modulation timing providing a desired optical power.

12. An optical receiver for communicating with an optical transmitter through a plurality of communication channels, comprising:
- a photon detector for detecting photon arrival of a series of optical pulses according to driving timing having time intervals each corresponding to a constant period of time, wherein the series of optical pulses is transmitted by the optical transmitter through a first communication channel;
- a counter for counting a number of photons detected by the photon detector;
- a measurement section for measuring optical power of the series of optical pulses from a time average of the number of photons counted by the counter in each of the time intervals while phase-shifting the driving timing in steps of a predetermined amount of phase within a predetermined phase range which is substantially coincident with a period of the optical pulses; and
- a timing controller for controlling the modulation timing of the optical transmitter through a second communication channel based on the optical power measured by the measurement section.

13. The optical receiver according to claim 12, wherein the photon detector comprises a first photon detector and a second photon detector,
wherein the optical receiver further comprises an optical modulation state detector for detecting modulation states of optical pulses received from the optical transmitter through the first communication channel and outputs its optical detection signal to either the first photon detector or the second photon detector depending on detected modulation states.

14. The optical receiver according to claim 13, wherein the measurement section calculates a ratio of optical powers each measured by the first photon detector and the second photon detector, wherein the timing controller controls the modulation timing of the optical transmitter based on the ratio of optical powers.

15. A method for measuring optical power of a series of optical pulses, comprising:
- shifting driving timing of a photon detector, wherein the driving timing has time intervals each corresponding to a constant period of time;
- detecting photon arrival of the series of optical pulses by driving the photon detector according to the driving timing;
- counting a number of photons detected by the photon detector; and
- measuring optical power of the series of optical pulses from a time average of the number of photons counted in each of the time intervals while phase-shifting the driving timing in steps of a predetermined amount of phase within a predetermined phase range which is substantially coincident with a period of the optical pulses.

16. The method according to claim 15, wherein the number of photons is counted for a period of time corresponding to a plurality of time intervals at the driving timing for each phase shift.

17. The method according to claim 15, wherein by sequentially and continuously shifting the driving timing in steps of the predetermined amount of phase, the optical power is measured based on the number of photons obtained when the driving timing has been completely shifted over the predetermined phase range, and wherein the predetermined phase range corresponds to 360 degrees.

18. The method according to claim 15, wherein by sequentially shifts the driving timing in steps of the predetermined amount of phase, storing in a memory the number of photons obtained at the driving timing for each phase shift, wherein when the driving timing has been completely shifted over the predetermined phase range, the optical power is measured based on the number of photons stored in the memory.

19. The method according to claim 15, wherein the number of photons counted is stored in a memory at the driving timing for each phase shift while sequentially shifting the driving timing, wherein the optical power is measured based on the number of photons stored in the memory.

20. A computer-readable medium storing a computer program for measuring optical power of a series of optical pulses, comprising:
- shifting driving timing of a photon detector, wherein the driving timing has time intervals each corresponding to a constant period of time;
- detecting photon arrival of the series of optical pulses by driving the photon detector according to the driving timing;
- counting a number of photons detected by the photon detector; and
- measuring optical power of the series of optical pulses from a time average of the number of photons counted in each of the time intervals while phase-shifting the driving timing in steps of a predetermined amount of phase within a predetermined phase range which is substantially coincident with a period of the optical pulses,
wherein the number of photons counted is stored in a memory at the driving timing for each phase shift while sequentially shifting the driving timing, wherein the optical power is measured from the time average of the number of photons stored in the memory.

21. The apparatus according to claim 1, wherein the driving timing is determined at least in part based on a random number.

22. The optical communication system according to claim 10, wherein the driving timing is determined at least in part based on a random number.

23. The computer readable medium according to claim 20, wherein the driving timing is determined at least in part based on a random number.

24. The apparatus according to claim 1, wherein the predetermined amount of phase which is each phase-shifting step of the driving timing is shorter than the predetermined phase range.

25. The optical communication system according to claim 10, wherein the predetermined amount of phase which is each phase-shifting step of the driving timing is shorter than the predetermined phase range.

26. The optical receiver according to claim 12, wherein the predetermined amount of phase which is each phase-shifting step of the driving timing is shorter than the predetermined phase range.

27. The method according to claim 15, wherein the predetermined amount of phase which is each phase-shifting step of the driving timing is shorter than the predetermined phase range.

28. The computer-readable medium according to claim 20, wherein the predetermined amount of phase which is each phase-shifting step of the driving timing is shorter than the predetermined phase range.

* * * * *